US010431852B2

(12) United States Patent
Maeda et al.

(10) Patent No.: US 10,431,852 B2
(45) Date of Patent: Oct. 1, 2019

(54) FLAT SECONDARY BATTERY

(71) Applicant: Envision AESC Japan Ltd., Zama-shi, Kanagawa (JP)

(72) Inventors: Takehiro Maeda, Kyoto (JP); Takamitsu Saito, Kanagawa (JP); Azusa Matsuo, Kanagawa (JP); Ami Oume, Kanagawa (JP); Yoshiaki Nitta, Kanagawa (JP)

(73) Assignee: Envision AESC Japan Ltd., Zama-shi, Kanagawa (JP)

( * ) Notice: Subject to any disclaimer, the term of this patent is extended or adjusted under 35 U.S.C. 154(b) by 0 days.

(21) Appl. No.: 15/302,435

(22) PCT Filed: Mar. 31, 2015

(86) PCT No.: PCT/JP2015/060125
§ 371 (c)(1),
(2) Date: Oct. 6, 2016

(87) PCT Pub. No.: WO2015/156167
PCT Pub. Date: Oct. 15, 2015

(65) Prior Publication Data
US 2017/0025710 A1    Jan. 26, 2017

(30) Foreign Application Priority Data

Apr. 11, 2014    (JP) ................. 2014-082374

(51) Int. Cl.
| | | |
|---|---|---|
| H01M 10/0585 | (2010.01) | |
| H01M 2/02 | (2006.01) | |
| H01M 10/04 | (2006.01) | |
| H01M 4/131 | (2010.01) | |
| H01M 4/133 | (2010.01) | |
| H01M 10/0525 | (2010.01) | |

(Continued)

(52) U.S. Cl.
CPC ....... *H01M 10/0585* (2013.01); *H01M 2/024* (2013.01); *H01M 2/0275* (2013.01);
(Continued)

(58) Field of Classification Search
None
See application file for complete search history.

(56) References Cited

U.S. PATENT DOCUMENTS

2005/0271943 A1* 12/2005 Park ................. C01G 45/1242
429/231.1
2007/0009794 A1    1/2007 Takami et al.
(Continued)

FOREIGN PATENT DOCUMENTS

| JP | 2000067925 A | 3/2000 |
|---|---|---|
| JP | 2001297748 A | 10/2001 |

(Continued)

*Primary Examiner* — Carmen V Lyles-Irving
(74) *Attorney, Agent, or Firm* — Young, Basile Hanlon & MacFarlane, P.C.

(57) ABSTRACT

A flat secondary battery has a laminate-type power generation element in which two or more plate-like electrodes are laminated via separators; and a pair of rectangular exterior members defined by long sides and short sides when viewed from a lamination direction of the two or more electrodes that seal the power generation element and an electrolyte solution. At least one exterior member of the pair of the rectangular exterior members comprises: an abutting part including an abutting surface that abuts against an uppermost layer electrode of the two or more electrodes; a sealing part at which the rectangular exterior members overlap each other at an outer circumferential position of the rectangular exterior members; and an extending part that extends from the abutting part to the sealing part, and the flat secondary battery satisfies $1 \leq LA/LB \leq 2$.

3 Claims, 10 Drawing Sheets

(51) Int. Cl.
  *H01M 2/16* (2006.01)
  *H01M 4/505* (2010.01)
  *H01M 4/525* (2010.01)
  *H01M 4/587* (2010.01)
  *H01M 4/62* (2006.01)
  *H01M 4/66* (2006.01)
  *H01M 10/0569* (2010.01)
  *H01M 4/02* (2006.01)

(52) U.S. Cl.
  CPC ......... *H01M 2/1673* (2013.01); *H01M 4/131* (2013.01); *H01M 4/133* (2013.01); *H01M 4/505* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0413* (2013.01); *H01M 10/0525* (2013.01); *H01M 10/0569* (2013.01); *H01M 2004/027* (2013.01); *H01M 2004/028* (2013.01); *H01M 2220/20* (2013.01); *Y02E 60/122* (2013.01); *Y02T 10/7011* (2013.01)

(56) References Cited

U.S. PATENT DOCUMENTS

| 2007/0141469 | A1 | 6/2007 | Tokunaga et al. |
| 2008/0305394 | A1* | 12/2008 | Hisamitsu ............... H01M 4/13 429/209 |
| 2011/0104527 | A1 | 5/2011 | Choi et al. |
| 2012/0288763 | A1 | 11/2012 | Ohira et al. |
| 2013/0084499 | A1 | 4/2013 | Yanagita et al. |
| 2014/0043727 | A1 | 2/2014 | Lv et al. |

FOREIGN PATENT DOCUMENTS

| JP | 2006079858 A | 3/2006 |
| JP | 2006185710 A | 7/2006 |
| JP | 2007018881 A | 1/2007 |
| JP | 2007194202 A | 8/2007 |
| JP | 2011507183 A | 3/2011 |
| JP | 2012033449 A | 2/2012 |
| JP | 2012234778 A | 11/2012 |
| JP | 2013073867 A | 4/2013 |
| JP | 2013084566 A | 5/2013 |

* cited by examiner

FLAT SECONDARY BATTERY

CROSS REFERENCE TO RELATED APPLICATION

This application claims priority to Japanese Patent Application No. 2014-082374, filed on Apr. 11, 2014, incorporated herein by reference in its entirety.

TECHNICAL FIELD

The present invention relates to a flat secondary battery.

BACKGROUND

JP 2001-297748 A discloses a nonaqueous electrolyte secondary battery comprising a flat battery element, a bag-like exterior case which houses the flat battery element, a positive electrode lead which is led out from a sealing part of the exterior case, and a negative electrode lead which is led out from the sealing part of the exterior case. The flat battery element is configured such that sheet-like or film-like positive electrode plates, separators for holding electrolyte, and negative electrode plates are laminated. One end of the positive electrode lead is connected to the positive electrode plates and one end of the negative electrode lead is connected to the negative electrode plates.

The above secondary battery has an anisotropic property in the contraction ratio. That is, when the charge and discharge are repeated and accordingly the electrodes expand in the thickness direction, the contraction ratio is different between in the direction along the long side and in the direction along the short side with respect to the lamination surface of the electrodes. The above secondary battery has one extra space and the other extra space, the one extra space is formed at the short side of the lamination surface of the electrodes, the other extra space is formed at the long side of the lamination surface of the electrodes, and the one extra space and the other extra space are formed between the laminate of electrodes and the laminated exterior case. In addition, when the electrodes expand in the thickness direction, the volume of the one extra space is excessively larger than the volume of the other extra space. Therefore, the electrolyte solution and the generated gas concentrate in the other extra space to lead to un-uniform cell reaction and poor durability of the cell, which may be problematic.

SUMMARY

Problems to be solved by the present invention include providing a flat secondary battery in which the cell reaction is suppressed from being un-uniform and the durability of the cell can be improved even when the charge and discharge are repeated and accordingly the electrodes expand in the thickness direction.

Means for Solving Problems

The present invention solves the above problems by providing a flat secondary battery comprising a laminate-type power generation element and a pair of exterior members which seals the laminate-type power generation element and seals an electrolyte solution. The pair of exterior members are formed into a rectangular shape when viewed from a lamination direction of electrodes. The exterior member comprises an abutting part including an abutting surface that abuts against an uppermost layer electrode, a sealing part at which the exterior members overlap each other at an outer circumferential position of the exterior members, and an extending part that extends from the abutting part to the sealing part. Average lengths ($L_A$, $L_B$) of the extending parts satisfy $1 \leq L_A/L_B \leq 2$.

Effect of Invention

The present invention defines extra spaces between the power generation element and the exterior member with consideration for the anisotropic property of the contraction of electrodes when repeating the charge and discharge. Therefore, even when the extra spaces contract in the long side direction of the exterior member, the volume of an extra space formed at the short side of the lamination surface of the electrodes can be suppressed from being excessively large. This can result in suppression of the un-uniform cell reaction and improvement of the durability of the cell.

DETAILED DESCRIPTION OF THE EMBODIMENTS

Mode(S) for Carrying Out the Invention

Hereinafter, one or more embodiments of the present invention will be described with reference to the drawings.

Figure 1:
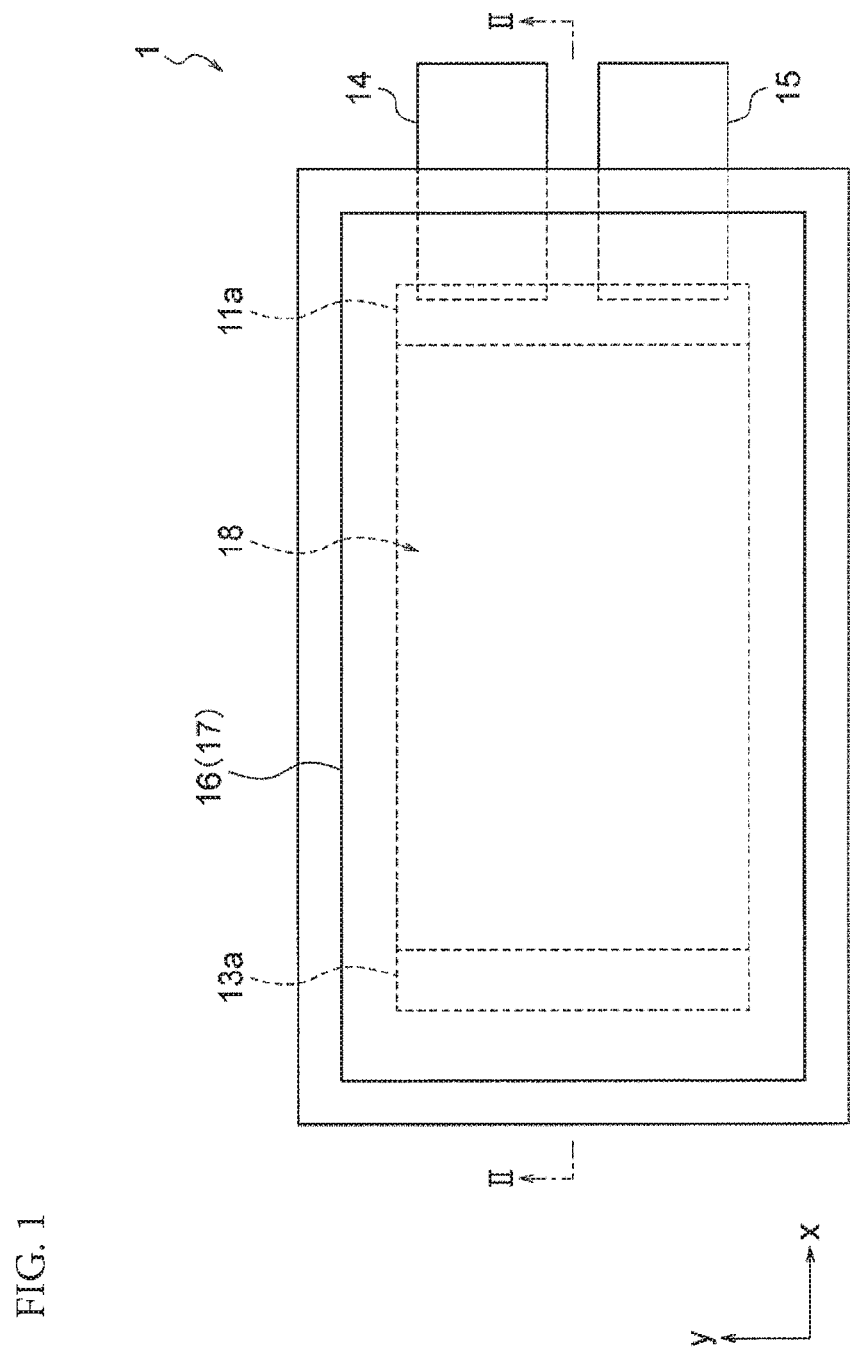
FIG. 1 is a plan view of a secondary battery according to one or more embodiments of the present invention.
Figure 2:
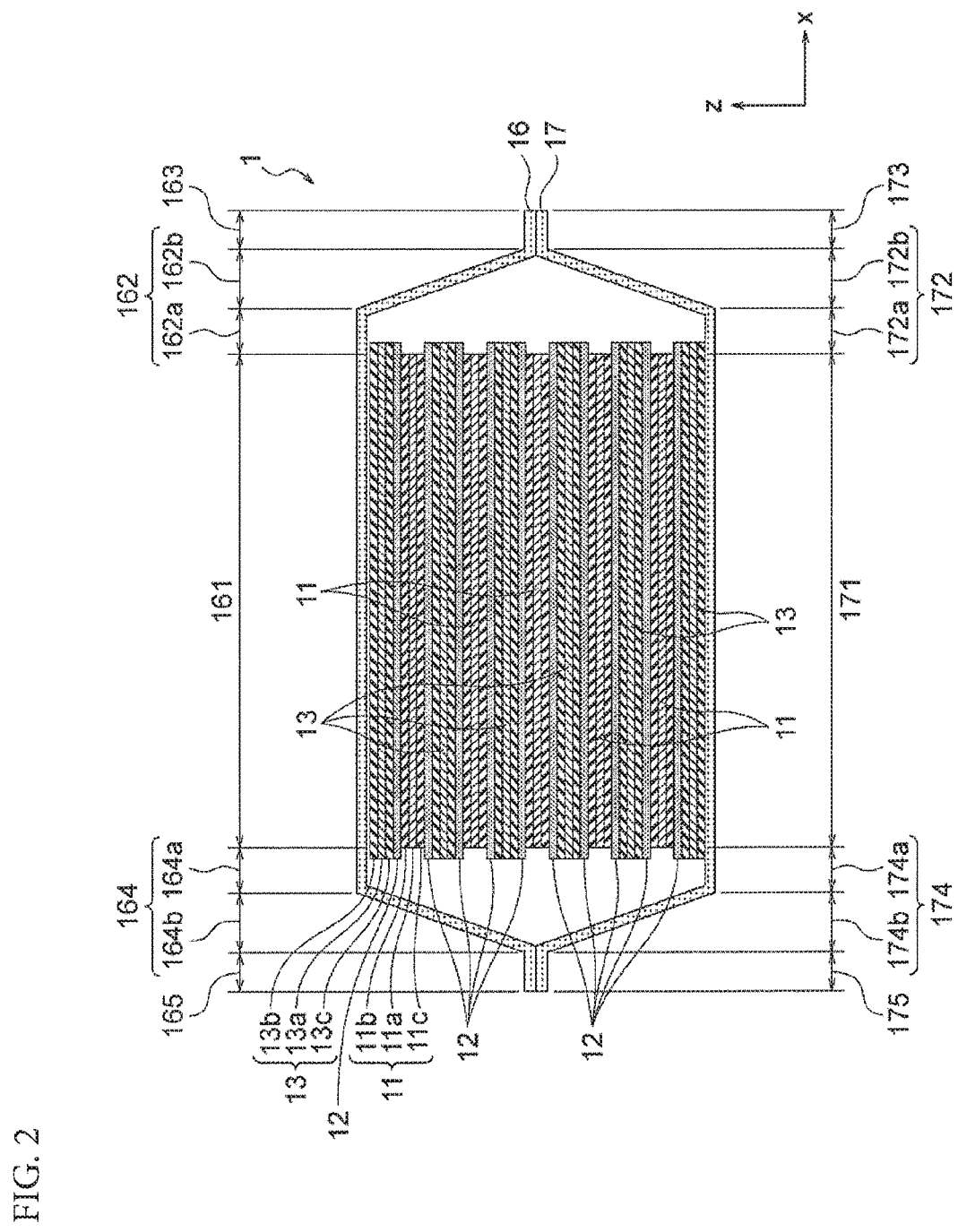
FIG. 2 is a cross-sectional view along line II-II of FIG. 1.

Secondary battery 1 according to one or more embodiments of the present invention is a lithium-based, plate-like, laminate-type flat (thin) battery. The secondary battery 1 comprises five positive electrode plates 11, ten separators 12, six negative electrode plates 13, a positive electrode terminal 14, a negative electrode terminal 15, an upper exterior member 16, a lower exterior member 17, and an electrolyte which is not particularly illustrated, as illustrated in FIG. 1 and FIG. 2. The numbers of the positive electrode plates 11, separators 12, and negative electrode plates 13 are merely exemplified and other numbers thereof may also be employed.

The positive electrode plates 11, separators 12, and negative electrode plates 13 constitute a power generation element 18. The positive electrode plates 11 and negative electrode plates 13 constitute electrode plates. The upper exterior member 16 and lower exterior member 17 constitute a pair of exterior members.

Each of the positive electrode plates 11 has a positive electrode-side collector 11a that extends to the positive electrode terminal 14 and positive electrode layers 11b and 11c that are formed on both main surfaces of a part of the positive electrode-side collector 11a. The positive electrode layers 11b and 11c may be formed only on areas of each positive electrode plate 11 at which the positive electrode plate 11 substantially overlaps the separators 12 when the positive electrode plates 11, separators 12, and negative electrode plates 13 are laminated to constitute the power generation element 18. In one or more embodiments of the present invention, the positive electrode plate 11 and the positive electrode-side collector 11a are formed of one conductor, but the positive electrode plate 11 and the positive electrode-side collector 11a may be configured as separate components and then bonded with each other.

The positive electrode-side collector 11a of the positive electrode plate 11 is composed of aluminum foil. The positive electrode-side collector 11a may also be composed of electrochemically stable metal foil, such as aluminum alloy foil, copper foil, and nickel foil. The positive electrode layers 11b and 11c of the positive electrode plate 11 contain a lithium-nickel-manganese-cobalt composite oxide (referred also to as an "NMC composite oxide," hereinafter) as the positive electrode active material. The NMC composite oxide has a layered crystal structure in which lithium atom layers and transition metal atom layers (of Mn, Ni, and Co that are orderly arranged) are stacked alternately via oxygen atom layers and one Li atom is included in terms of one atom of transition metal M so as to increase an amount of extractable Li and so as to have high capacity. The positive electrode active material may also be a lithium composite oxide, such as lithium nickelate ($LiNiO_2$), lithium manganate ($LiMnO_2$), and lithium cobaltate ($LiCoO_2$), or a mixture thereof.

The positive electrode layers 11b and 11c are formed by preparing a positive electrode active material that contains the NMC composite oxide, preparing a mixture of the positive electrode active material, a conductive agent, a binder (adhesive), and a slurry viscosity adjusting solvent, applying the mixture to both main surfaces of the positive electrode-side collector 11a, and drying and flatting the mixture. The conductive agent may be a carbon black such as Ketjen black and acetylene black. The binde may be aqueous dispersion of polyvinylidene fluoride (PVdF) and/or polytetrafluoroethylene (PTFE). The slurry viscosity adjusting solvent is N-methyl-2-pyrrolidone (NMP) or the like.

Each of the negative electrode plates 13 which constitute the power generation element 18 has a negative electrode-side collector 13a that extends to the negative electrode terminal 15 and negative electrode layers 13b and 13c that are formed on both main surfaces of a part of the negative electrode-side collector 13a. Similar to the positive electrode side, the negative electrode layers 13b and 13c of the negative electrode plate 13 may also be formed only on areas of each negative electrode plate 13 at which the negative electrode plate 13 substantially overlaps the separators 12. In one or more embodiments of the present invention, the negative electrode plate 13 and the negative electrode-side collector 13a are formed of one conductor, but the negative electrode plate 13 and the negative electrode-side collector 13a may be configured as separate components and then bonded with each other.

The negative electrode-side collector 13a of the negative electrode plate 13 is composed of copper foil. The negative electrode-side collector 13a may also be composed of electrochemically stable metal foil, such as nickel foil, stainless steel foil, and iron foil. The negative electrode layers 13b and 13c of the negative electrode plate 13 contain synthetic graphite as the negative electrode active material. The negative electrode active material may be material which absorb and release lithium ions, such as Si alloy, mixture of graphite and Si, amorphous carbon, non-graphitizable carbon, graphitizable carbon, and graphite.

The negative electrode layers 13b and 13c are formed by preparing a negative electrode active material that contains synthetic graphite while containing ammonium salt of carboxymethyl cellulose and styrene-butadiene copolymer latex as binders, dispersing the negative electrode active material in purified water to obtain a negative electrode active material slurry, applying the slurry to both main surfaces of the negative electrode-side collector 13a, and drying and flatting the slurry. The negative electrode active material slurry to be used may also be obtained by dispersing PVdF as a binder in NMP.

The separators 12 of the power generation element 18 are to prevent short circuit between the above-described positive electrode plates 11 and negative electrode plates 13, and the separators 12 may have a function of holding an electrolyte. Each separator 12 is a microporous membrane that is composed, for example, of polyolefin such as polyethylene (PE) and polypropylene (PP), and has a function of shutting off an excessive current so that the heat generated by the excessive current blocks the pores.

The separator 12 used in one or more embodiments of the present invention is not limited only to a single-layer membrane. The separator 12 may be formed by a membrane of a three-layer structure in which a polypropylene membrane is sandwiched by polyethylene membranes. The separator 12 may be formed by a membrane configured such that a polyolefin microporous membrane, an organic nonwoven fabric and the like are laminated. The separator 12 may be a separator having a heat-resistant and insulating layer (ceramic layer) at the surface (so-called ceramic separator). Making the separator 12 as a multilayer in such a manner can give various functions, such as a function of preventing an excessive current, a function of holding an electrolyte, and a function of maintaining the shape of the separator (enhancing the stiffness), to the separator.

The above power generation element 18 is configured as a laminate-type power generation element in which the positive electrode plates 11 and the negative electrode plates 13 are laminated alternately via each of the separators 12 (The power generation elements 18 includes pairs of electrodes laminated via a separator 12, each of the pairs of the electrodes having which two or more plate-like electrodes are laminated via each of separators.). The five positive electrode plates 11 are connected to the positive electrode terminal 14 of metal foil via the positive electrode-side collectors 11a. Similarly, the six negative electrode plates 13 are connected to the negative electrode terminal 15 of metal foil via the negative electrode-side collectors 13a.

The positive electrode terminal 14 and the negative electrode terminal 15 are not particularly limited, provided that they are made of electrochemically stable metal material. Examples of the positive electrode terminal 14 include, as in the above-described positive electrode-side collector 11a, aluminum foil, aluminum alloy foil, copper foil, and nickel foil which have, for example, a thickness of about 0.2 mm. Examples of the negative electrode terminal 15 include, as in the above-described negative electrode-side collector 13a, nickel foil, copper foil, stainless steel foil, and iron foil which have, for example, a thickness of about 0.2 mm.

In one or more embodiments of the present invention, the electrode plates 11 and 13 are configured to be connected to the electrode terminals 14 and 15 such that the metal foil which constitutes each of the collectors 11a and 13a is extended to the electrode terminal 14 or 15. That is, the electrode layer (positive electrode layer 11b or 11c or negative electrode layer 13b or 13c) is formed on a part of one collector foil 11a or 13a while the remaining end part of the collector foil is used as a connection member with the electrode terminal. As previously described, the metal foil which constitutes each of the collector 11a and 13a and the metal foil which constitutes the connection member may also be connected with each other by using another material or component.

The upper exterior member 16 and the lower exterior member 17 house and seal the power generation element 18 together with an electrolyte. As will be understood, the power generation element may be a part of the laminated electrode plates within which the positive electrodes and the negative electrodes substantially overlap one another via the separators. The upper exterior member 16 and the lower exterior member 17 serve as a pair of members that constitute a case for sealing the power generation element 18 and the electrolyte solution. The upper exterior member 16 and the lower exterior member 17 are configured as below.

As illustrated in FIG. 2, the upper exterior member 16 and the lower exterior member 17 are each formed into a cup shape. The upper exterior member 16 has an abutting part 161, an extending part 162, an extending part 164, and a sealing part 163, and a sealing parts 165. The lower exterior member 17 has an abutting part 171, an extending part 172 and an extending part 174, and a sealing part 173 and a sealing part 175. The upper exterior member 16 and the lower exterior member 17 are each formed into a rectangular shape defined by long sides and short sides when viewed from the lamination direction (z-direction in FIG. 1) of the electrode plates laminated in the power generation element 18.

The abutting part 161 has an abutting surface that abuts against a main surface (surface parallel to the lamination surface of the electrode plates laminated in the power generation element 18: xy-plane in FIG. 1) of the negative electrode plate 13. The abutting surface is parallel to a main surface of the negative electrode plate 13 located at the uppermost layer and has the same shape as that of the main surface. The abutting surface of the abutting part 161 corresponds to the lower surface of a lower-layer member of the abutting part 161 which is a multilayer. When the exterior members 16 and 17 are worked to seal the power generation element 18, the abutting part 161 applies a pressure to the negative electrode plate 13 located at the uppermost layer. On the other hand, when the charge and discharge are repeated and accordingly the power generation element 18 expands in the thickness direction (z-direction in FIG. 2), the abutting part 161 receives a pressure directly from the negative electrode plate 13. The abutting surface of the abutting part 161 is an area that is within the main surface of the exterior member 16 corresponding to the main surface of the negative electrode plate 13 and that receives a pressure from the power generation element 18. The abutting surface receives a pressure as the reaction force from the power generation element 18 in a state in which the exterior members 16 and 17 seal the power generation element 18. The abutting surface otherwise receives a pressure from the power generation element 18 when the power generation element 18 expands due to the use of battery.

The sealing parts 163 and 165 are in close contact with the sealing parts 173 and 175, respectively, of the exterior member 17 while overlapping them. The sealing parts 163 and 165 are located at the outer circumference of the exterior member 16. The sealing parts 163 and 165 are configured to surround the power generation element 18 in a plan view of the exterior member 16 when viewed from the z-direction. The sealing parts 163 and 165 are located outside the abutting part 161 via the extending parts 162 and 164 in a plan view of the exterior member 16 when viewed from the z-direction. The sealing parts 163 and 165 are located at positions between the abutting part 161 and the abutting part 171 with respect to the height in the lamination direction (z-direction) of electrode plates of the power generation element 18. In other words, the sealing parts 163 and 165 are located at lower positions than a position of the abutting part 161 with respect to the height in the lamination direction (z-direction). In the example of FIG. 2, the sealing parts 163 and 165 are located at the middle position between the abutting part 161 and the abutting part 171 with respect to the height in the lamination direction (z-direction).

The sealing parts 163 and 165 illustrated in FIG. 2 are located at both ends of the exterior member 16, which is formed in a rectangular shape, along the long sides. In addition, another pair of sealing parts like the sealing parts 163 and 165 is formed at both end positions of the exterior member 16 along the short sides.

The extending part 162 is a part in which the exterior member 16 extends from the abutting part 161 to the sealing part 163. The extending part 162 is a member for forming a space between the laminate-type power generation element 18 and the sealing parts 163 and 173 (side surfaces of the exterior members 16 and 17).

The extending part 162 has a flat part 162a and an inclined part 162b. The flat part 162a is formed with a surface parallel to the abutting surface of the abutting part 161. The inclined part 162b is formed with a surface inclined with respect to the parallel surface to the flat part 162a. The exterior member 16 extends along the abutting surface of the abutting part 161 thereby to form the flat part 162a and the exterior member 16 is curved at the outer edge of the flat part 162a to extend toward the sealing part 163 thereby to form the inclined part 162b. The flat part 162a functions as a margin when forming the space between the laminate-type power generation element and the sealing parts 163 and 173 (side surfaces of the exterior members 16 and 17). Providing the flat part 162a allows the space to extend in the direction (x-direction or y-direction) along the lamination surface of the electrodes.

The extending part 164 is a part in which the exterior member 16 extends from the abutting part 161 to the sealing part 165. The extending part 164 has a flat part 164a and an inclined part 164b. The extending part 164, flat part 164a, and inclined part 164b are configured in similar manners to those for the above-described extending part 162, flat part 162a, and inclined part 162b, respectively, and the description will therefore be omitted.

The extending parts 162 and 164 are formed at both end positions of the exterior member 16 along the long sides, and another pair of extending parts like the extending parts 162 and 164 is also formed at both end positions of the exterior member 16 along the short sides.

The exterior member 17 is a member that seals the power generation element 18 and the electrolyte from the opposite side to the exterior member 16. The exterior member 17 is configured in a similar manner to that for the exterior member 16, and the description will therefore be omitted. As will be understood, the abutting part 171 is configured in a similar manner to that for the abutting part 161, the extending parts 172 and 174 are configured in similar manners to those for the extending parts 162 and 164, and the sealing parts 173 and 175 are configured in similar manners to those for the sealing parts 163 and 165. This allows the exterior members 16 and 17 to be configured in a form of a pair of cups.

Although not particularly illustrated, in one or more embodiments of the present invention, the upper exterior member 16 and the lower exterior member 17 each have a three-layer structure in which an interior layer, an intermediate layer, and an exterior layer are arranged in this order from the inside to the outside of the secondary battery 1. The interior layer is composed of a film of resin, such as polyethylene, modified polyethylene, polypropylene, modified polypropylene, and ionomer, which is excellent in the electrolyte solution resistance and thermal adhesiveness. The intermediate layer is composed, for example, of metal foil such as aluminum foil. The exterior layer is composed of a film of resin, such as polyamide-based resin and polyester-based resin, which is excellent in the electrical insulation.

Thus, the upper exterior member 16 and the lower exterior member 17 are formed of a material having flexibility, such as a resin-metal thin film laminate material. This flexible material is configured, for example, such that one surface (at the side of interior surface of the secondary battery 1) of metal foil such as aluminum foil is laminated with a resin and the other surface (at the side of exterior surface of the secondary battery 1) is laminated with another resin. Examples of the resin used for the one surface include polyethylene, modified polyethylene, polypropylene, modified polypropylene, and ionomer. Examples of the resin used for the other surface include polyamide-based resin and polyester-based resin.

When the exterior members 16 and 17 are each provided with a metal layer in addition to resin layers in the above manner, it is possible to enhance the strength of the exterior member itself. Moreover, when the interior layers of the exterior members 16 and 17 are composed, for example, of a resin such as polyethylene, modified polyethylene, polypropylene, modified polypropylene, and ionomer, it is possible to ensure the excellent thermal adhesiveness with the metallic electrode terminals 14 and 15.

As illustrated in FIG. 1 and FIG. 2, the positive electrode terminal 14 is led out from one end part of the sealed exterior members 16 and 17 while the negative electrode terminal 15 is led out from the other end part. Accordingly, a gap corresponding to the thickness of the electrode terminals 14 and 15 is generated in the thermal adhesion part between the upper exterior member 16 and the lower exterior member 17. In order to maintain the sealing ability in the secondary battery 1, a sealing film composed of an appropriate material such as polyethylene and polypropylene, for example, may be interposed between the electrode terminals 14 and 15 and the exterior members 16 and/or 17. This sealing film may preferably be composed of the same series of resin as the resin that constitutes the exterior members 16 and 17 for both the positive electrode terminal 14 and the negative electrode terminal 15 in view of the thermal adhesiveness.

After the above-described power generation element 18, a part of the positive electrode terminal 14, and a part of the negative electrode terminal 15 are wrapped with the exterior members 16 and 17 and the interior space formed between the exterior members 16 and 17 is suctioned to a vacuum state while being injected with a liquid electrolyte, the outer edges of the exterior members 16 and 17 are hot-pressed for thermal adhesion and sealing. The liquid electrolyte may be obtained by dissolving a solute of lithium salt, such as lithium perchlorate, lithium borofluoride, and lithium hexafluorophosphate, in an organic liquid solvent.

Examples of the organic liquid solvent include ester-based solvent such as propylene carbonate (PC), ethylene carbonate (EC), dimethyl carbonate (DMC), diethyl carbonate (DEC) and ethyl methyl carbonate (EMC), and those in which an additive such as vinylene carbonate (VC), fluoroethylene carbonate (FEC) and propane sultone (PS) is added to the above solvent. The organic liquid solvent in one or more embodiments of the present invention is not limited to the above, and there can also be used an organic liquid solvent in which ether-based solvent such as γ-butyrolactone (γ-BL) and diethoxy ethane (DEE) or other solvent is mixed and blended with an ester-based solvent. The organic liquid solvent may preferably contain various additives, such as vinylene carbonate (VC), fluoroethylene carbonate (FEC), and 1,3-propanesultone (PS).

Next, the volumetric energy density and rated discharge capacity of the secondary battery 1 will be described. In general electric cars, market requirements for the traveling distance (cruisable distance) per charge may be several hundred kilometers. In consideration of such a cruisable distance, the volumetric energy density of the secondary battery 1 may preferably be 157 Wh/L or more, and the rated capacity may preferably be 20 Wh or more.

In the secondary battery 1 according to one or more embodiments of the present invention, the largeness of battery is defined from the relation of battery surface area and battery capacity as an aspect of the large battery different from an aspect of the physical largeness of electrodes. Specifically, the secondary battery 1 is a flat laminate-type battery, in which the value of a ratio of the battery surface area (projected area of the battery including the battery exterior body) to the rated discharge capacity is 5 $cm^2$/Ah or more and the rated discharge capacity is 3 Ah or more. When the battery is made to have such a large surface area and large capacity, the cycle characteristic tends to decrease due to the occurrence of a local overcharge mode in association with the variation of voltage in the electrode surfaces as described above.

The aspect ratio of the lamination surface of the rectangular electrodes is preferably 1 to 3 and more preferably 1 to 2. The aspect ratio of an electrode is defined as a ratio of the length of long side to the length of short side of a rectangular positive electrode active material layer. When the aspect ratio falls within such a range, both the required performance for vehicle and the mounting space can be advantageously satisfied.

Figure 3:
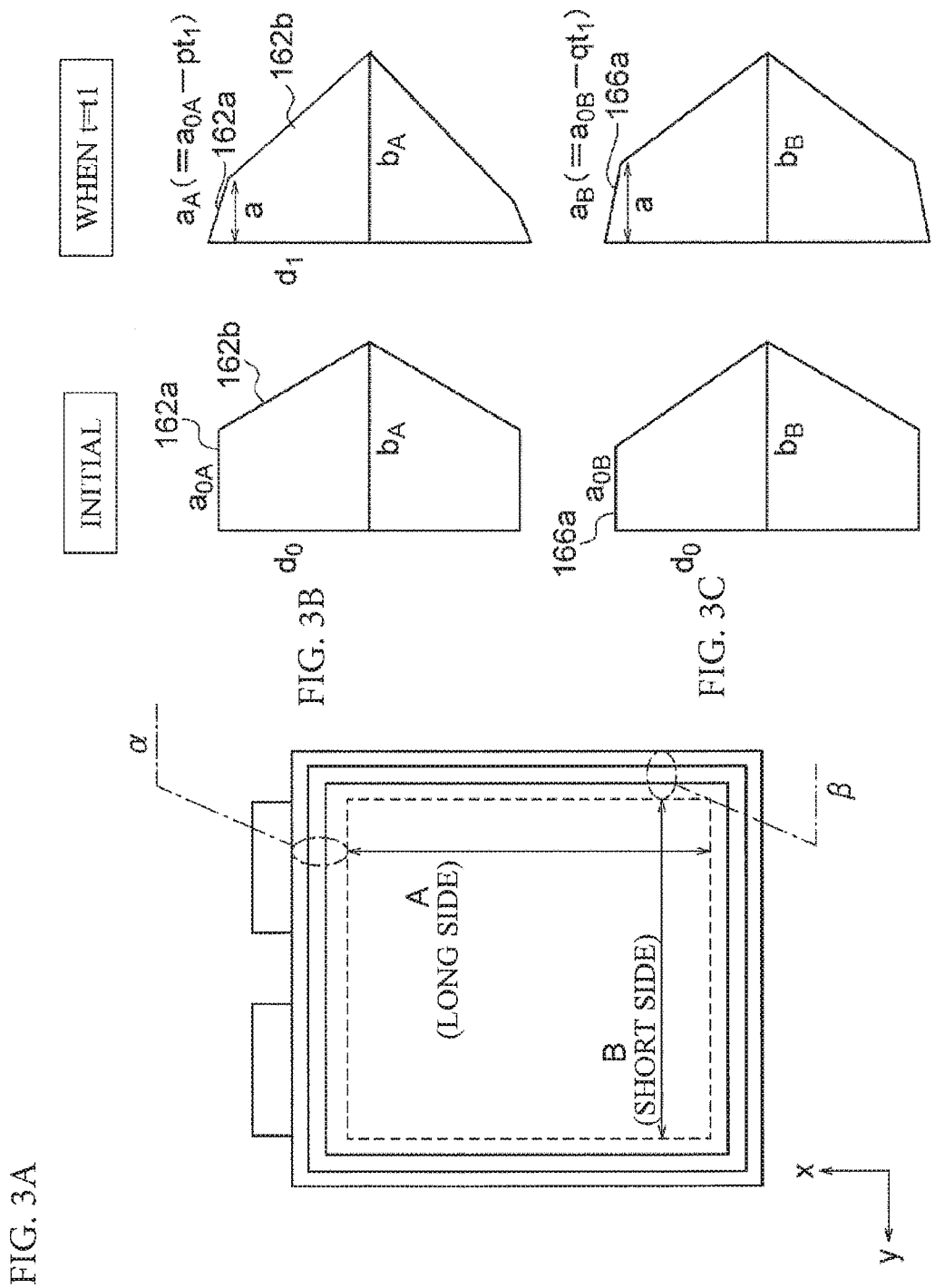
FIG. 3(A) is a plan view of the secondary battery of FIG. 1.
FIG. 3(B) illustrates enlarged extra spaces in the long side direction and FIG. 3(C) illustrates enlarged extra spaces in the short side direction.

Next, with reference to FIGS. 3(A)-3(C), the variation of extra spaces will be described when the charge and discharge are repeated and accordingly the electrodes of the power generation element 18 expand in the thickness direction. FIG. 3(A) is a plan view of the secondary battery. FIGS. 3(B) AND 3(C) are a set of cross-sectional views in which area α and area β of the secondary battery are enlarged. FIG. 3(B) illustrates states over time of both end parts in the direction along the long side. FIG. 3(C) illustrates states over time of both end parts in the direction along the short side. The extra spaces are spaces formed between the laminate-type power generation element 18 and the side surfaces (corresponding to the extending parts) of the exterior members 16 and 17. The long side and the short side represent sides of a rectangle that is the shape of each of the lower exterior members 16 and 17 when viewed from the lamination direction (z-direction) of the electrodes. Parameter $t_1$ represents a time (t) from the initial state to the state in which the battery expands.

In the initial state of the secondary battery, do is the thickness of the power generation element 18, $a_{0A}$ is the length of the flat part 162a located at the end part in the direction along the long side, and $a_{0B}$ is the length of the flat part 162a located at the end part in the direction along the short side. As used herein, the thickness do of the power generation element 18 is half the thickness of the entire power generation element 18. The thickness do of the power generation element 18 refers to a thickness from the electrode plate located at the height of the sealing parts 163 and 173 in the lamination direction (z-direction) to the electrode located at the uppermost layer. The length of the flat part 162a refers to a length of the flat part 162a in the direction (x-direction) along the parallel plane.

When charge and discharge of the secondary battery 1 are repeated, the power generation element 18 expands in the z-direction, so that the thickness of the power generation element 18 varies from $d_0$ to $d_1$ ($>d_0$). On the other hand, the width in the x-direction of the power generation element 18 decreases in accordance with the expansion in the z-direction. That is, the power generation element 18 contracts in the x-direction while expanding in the z-direction. Similarly, the width in the y-direction of the power generation element 18 decreases in accordance with the expansion in the z-direction. That is, the power generation element 18 also contracts in the y-direction while expanding in the z-direction.

The extending part 162 of the exterior member 16 deforms in accordance with the expansion in the z-direction of the power generation element 18. During this deformation, the length of the x-direction component of the flat part 162a in the long side direction decreases from $a_{0A}$ to $a_A$ ($<a_{0A}$) while the flat part 162a is inclined and drawn due to the expansion in the z-direction of the power generation element 18. Similarly, the length of the y-direction component of the flat part 162a in the short side direction decreases from $a_{0B}$ ($=a_{0A}$) to $a_B$ ($<a_{0B}$) while the flat part 162a is inclined and drawn due to the expansion in the z-direction of the power generation element 18.

At this time, the lamination surface of electrodes that constitute the power generation element 18 is long in the long side direction and short in the short side direction. Accordingly, the contraction velocity of the electrode plates in the direction along the xy-plane is faster in the direction along the long side than in the direction along the short side.

When the contraction velocity in the long side direction is p and the contraction velocity in the short side direction is q, p>q holds. The equations presented in FIG. 3(B) represent the length ($a_A$) of the flat part 162a in the long side direction and the length ($a_B$) of the flat part 166a in the short side direction after the contraction. The length ($a_A$) of the flat part 162a is shorter than the length ($a_B$) of the flat part 166a.

As described above, a power generation element configured in a rectangular shape when viewed from the lamination direction of electrode plates has an anisotropic property. The anisotropic property is a property that the contraction velocity is different between in the long side direction and in the short side direction. Therefore, if, for example, the volume of first extra spaces located at both ends in the long side direction is smaller than the volume of second extra spaces located at both ends in the short side direction unlike in the secondary battery 1 according to one or more embodiments of the present invention, the volume of the first extra spaces becomes smaller in accordance with the use of battery to diminish the volume of extra spaces. This leads to ununiform cell reaction and poor durability because the electrolyte solution and the gas generated in the cell concentrate in either set of extra spaces.

In consideration of the anisotropy as the above, it may be considered that a secondary battery is configured such that the volume of extra spaces is preliminarily excessively large. If the extra spaces are excessively large, however, the electrolyte solution is likely to stay in the extra spaces to impair the uniformity of electrolyte solution in the secondary battery 1 (liquid shortage). Therefore, an upper limit of the volume of extra spaces may have to be set to increase the space efficiency.

With consideration for the anisotropy as the above, the secondary battery 1 according to one or more embodiments of the present invention satisfies Expression (1) below to improve the durability of the cell. More specifically, in order to compensate for the volume balance of extra spaces after the power generation element expands, the relationship between the average ($L_A$) of lengths of a pair of extending parts located at both ends in the long side direction and the average ($L_B$) of lengths of a pair of extending parts located at both ends in the short side direction is defined to satisfy Expression (1) below. The volume balance of extra spaces compensates, for example, such that the volume of extra spaces formed at the short sides of the lamination surface of the electrodes does not become excessively large even when the extra spaces contract in the long side direction of the exterior member due to the expansion of the power generation element.

$$1 \leq L_A/L_B \leq 2 \tag{1}$$

Figure 4:
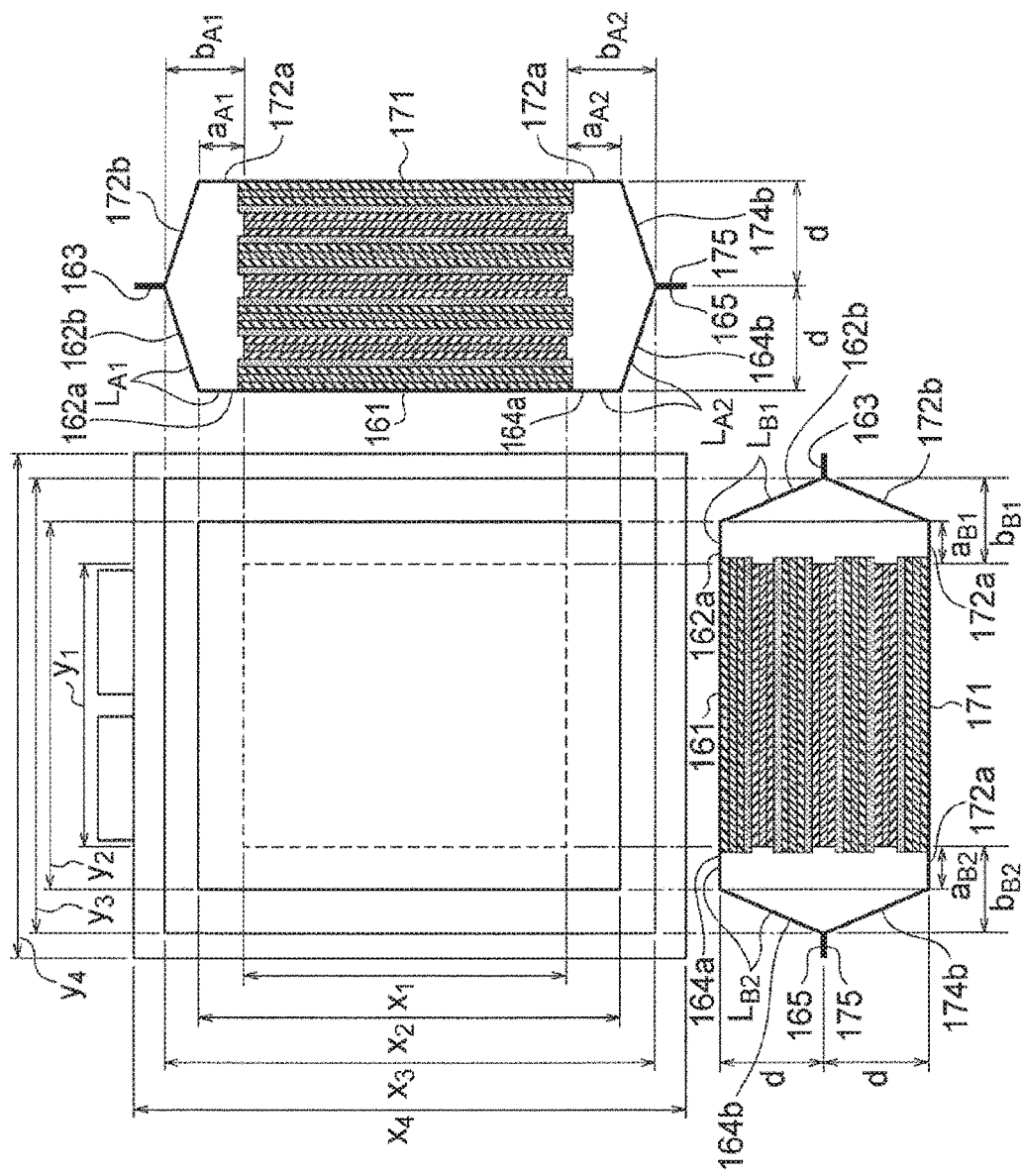
FIG. 4 is a set of plan view and cross-sectional views of the secondary battery according to one or more embodiments of the present invention.

FIG. 4 is a set of a plan view, a cross-sectional view when cut at the xz-plane along the long side, and a cross-sectional view when cut at the yz-plane along the short side of the secondary battery 1, and these views are for explaining parameters ($L_A$, $L_B$, d, $a_A$, and $a_B$) included in Expressions (1), Expressions (2), Condition (1), and Condition (2)

As illustrated in FIG. 4, in the cross section when cut at the xz-plane along the long side (referred also to as a "first cross section," hereinafter), $L_{A1}$ represents the length of the extending part 162, which is the total length of the length of the flat part 162a in the long side direction and the length of the inclined part 162b in the long side direction. In the first cross section, the flat part 162a and inclined part 162b in the long side direction are respectively a flat part and an inclined part that are located at one end part of both ends in the direction along the long side. $L_{A2}$ represents the length of the extending part 164, which is the total length of the length of the flat part 164a in the long side direction and the length of the inclined part 164b in the long side direction.

In the cross section when cut at the yz-plane along the short side (referred also to as a "second cross section," hereinafter), $L_{B1}$ represents the length of the extending part 162, which is the total length of the length of the flat part 162a in the short side direction and the length of the inclined part 162b in the short side direction. In the second cross section, the flat part 162a and inclined part 162b in the short side direction are respectively a flat part and an inclined part that are located at one end part of both ends in the direction along the short side. $L_{B2}$ represents the length of the extending part 164, which is the total length of the length of the flat part 164a in the short side direction and the length of the inclined part 164b in the short side direction.

$L_A$ included in Expression (1) is the average of $L_{A1}$ and $L_{A2}$, which is represented by $L_A=(L_{A1}+L_{A2})/2$. $L_B$ is the average of $L_{B1}$ and $L_{B2}$, which is represented by $L_B=(L_{B1}+L_{B2})/2$.

In the secondary battery 1 according to one or more embodiments of the present invention, the relationship among $L_A$, $L_B$, and d may preferably be defined to satisfy Condition 1 below.

$L_A/d \geq L_B/d$ is satisfied and a value of $L_A/d$ to b and a value of $L_B/d$ to b are between a first straight line and a second straight line within a range of $4 \leq b \leq 10$ (Condition 1).

In the above, d represents the thickness of the power generation element 18, which refers to a thickness from a specified electrode plate to the electrode plate located at the uppermost layer or a thickness from the specified electrode plate to the electrode plate located at the lowermost layer (see FIG. 4). The specified electrode plate is an electrode plate located at the height of the sealing parts 163 and 173 in the lamination direction (z-direction). In the above, b (mm) represents a length from the electrode located between the sealing parts 163 and 165 to the sealing parts 163, and a length from electrode located between the sealing parts 163 and 165 to the sealing parts 165. b (mm) represents a length from the electrode located between the sealing parts 173 and 175 to the sealing parts 173, and a length from the electrode located between the sealing parts 173 and 175 to the sealing parts 175. The first straight line represents a characteristic of the minimum value of $L_A/d$ to b or a characteristic of the minimum value of $L_B/d$ to b. The second straight line represents a characteristic of the maximum value of $L_A/d$ to b or a characteristic of the maximum value of $L_B/d$ to b. The first and second straight lines will be described in the examples.

This can relax the stress applied to portions abutting against the power generation element 18, and the stress applied to the sealing part 163 or the like when the power generation element 18 expands, because the extra spaces are extended while maintaining the volume balance with respect to the thickness of the power generation element 18. Therefore, even when the exterior member 16 deforms, the pressure applied to the power generation element 18 is suppressed from being ununiform, the cell reaction can be uniform, and the durability of the cell is improved.

In the secondary battery 1 according to one or more embodiments of the present invention, the relationship between $a_A$ and $a_B$ may preferably be defined to satisfy Expression (2) below.

$$1 \leq a_A/a_B \leq 7 \quad (2)$$

In the above, $a_A$ is the average of $a_{A1}$ and $a_{A2}$, which is represented by $a_A=(a_{A1}+a_{A2})/2$, and $a_B$ is the average of $a_{B1}$ and $a_{B2}$, which is represented by $a_B=(a_{B1}+a_{B2})/2$. As illustrated in FIG. 4, $a_{A1}$ is a length of the flat part 162a in the long side direction, and $a_{A2}$ is a length of the flat part 164a in the long side direction. Similarly, $a_{B1}$ is a length of the flat part 162a in the short side direction, and $a_{B2}$ is a length of the flat part 164a in the short side direction.

In the secondary battery 1 according to one or more embodiments of the present invention, the relationship among $a_A$, $a_B$, and d may preferably be defined to satisfy Condition 2 below.

An expression of $a_A/d \geq a_B/d$ is satisfied and a value of $a_A/d$ to b and a value of $a_B/d$ to b are between a third straight line and a fourth straight line within a range of $4 \leq b \leq 10$ (Condition 2).

The third straight line represents a characteristic of the minimum value of $a_A/d$ to b or a characteristic of the minimum value of $a_B/d$ to b. The fourth straight line represents a characteristic of the maximum value of $a_A/d$ to b or a characteristic of the maximum value of $a_B/d$ to b. The third and fourth straight lines will be described in the examples.

The definitions of shape of the secondary battery 1 represented by Expressions (1) and/or (2) and the definitions of shape of the secondary battery 1 satisfying Conditions 1 and/or 2 are applicable not only to the secondary battery 1 as illustrated in FIG. 1 and FIG. 2 but also to a secondary battery 1 according to Modified Example 1 below. In addition, the definitions of shape of the secondary battery 1 represented by Expression (1) and Condition 1 are applicable not only to the secondary battery 1 as illustrated in FIG. 1 and FIG. 2 but also to a secondary battery 1 according to Modified Example 2 below.

Figure 5:
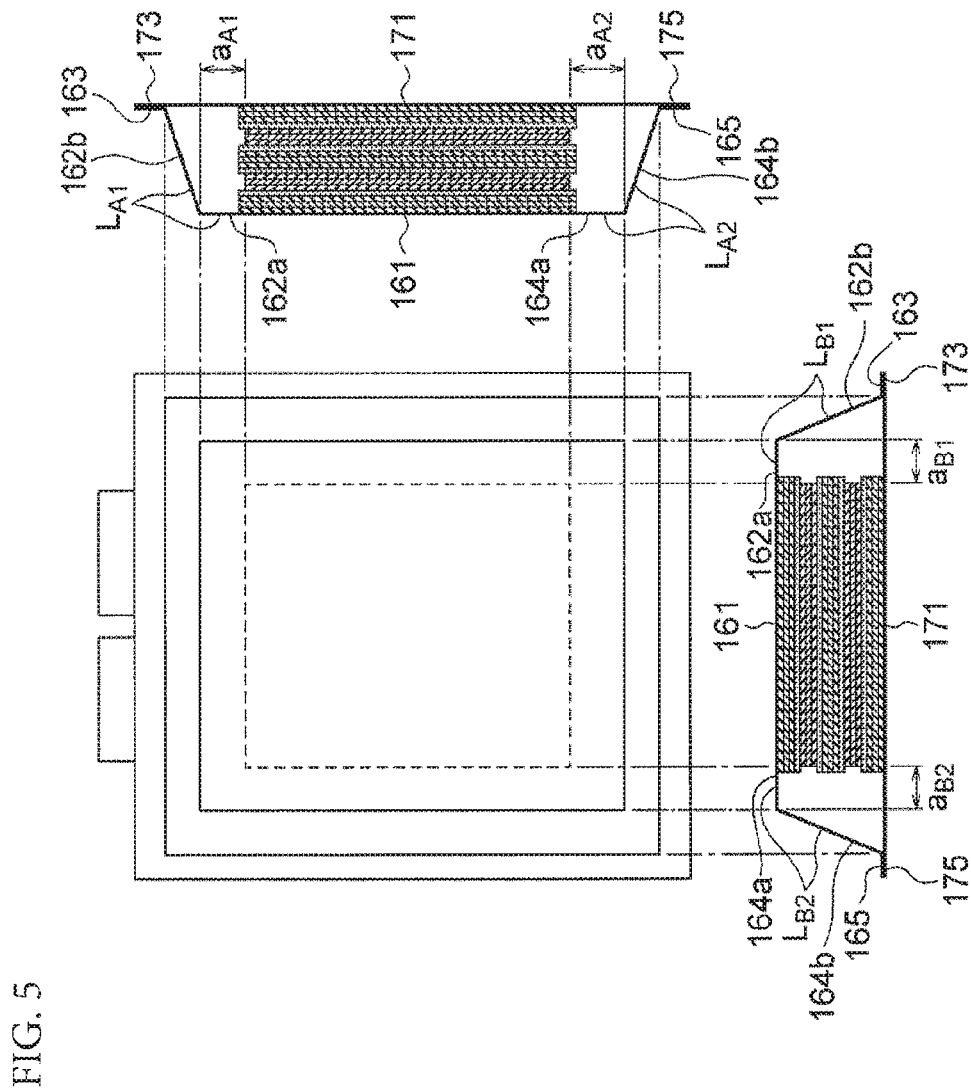
FIG. 5 is a set of plan view and cross-sectional views of a secondary battery according to a modified example of one or more embodiments of the present invention.

FIG. 5 is a set of a plan view, a cross-sectional view when cut at the xz-plane along the long side, and a cross-sectional view when cut at the yz-plane along the short side of the secondary battery 1 according to Modified Example 1, and these views are for explaining parameters ($L_A$, $L_B$, d, $a_A$, and $a_B$) included in Expressions (1), Expressions (2), Condition (1), and Condition (2).

As illustrated in FIG. 5, an exterior member 17 is formed as a plate and the main surface of the exterior member 17 is parallel to the lamination surface of electrode plates of a power generation element 18. In the main surface (xy-plane) of the exterior member 17, the interior side of the main surface abuts against the lowermost electrode plate of electrode plates that constitute the power generation element 18. The outer circumference of the main surface is formed with sealing parts 173 and 175 that overlap sealing parts 163 and 165 of an exterior member 16. The sealing parts 173 and 175 are in close contact with the sealing parts 163 and 165, respectively.

The upper exterior member 16 is similar to the upper exterior member 16 illustrated in FIG. 4, and the parameters ($L_A$, $L_B$, d, $a_A$, and $a_B$) are also similar to those in FIG. 4.

Figure 6:
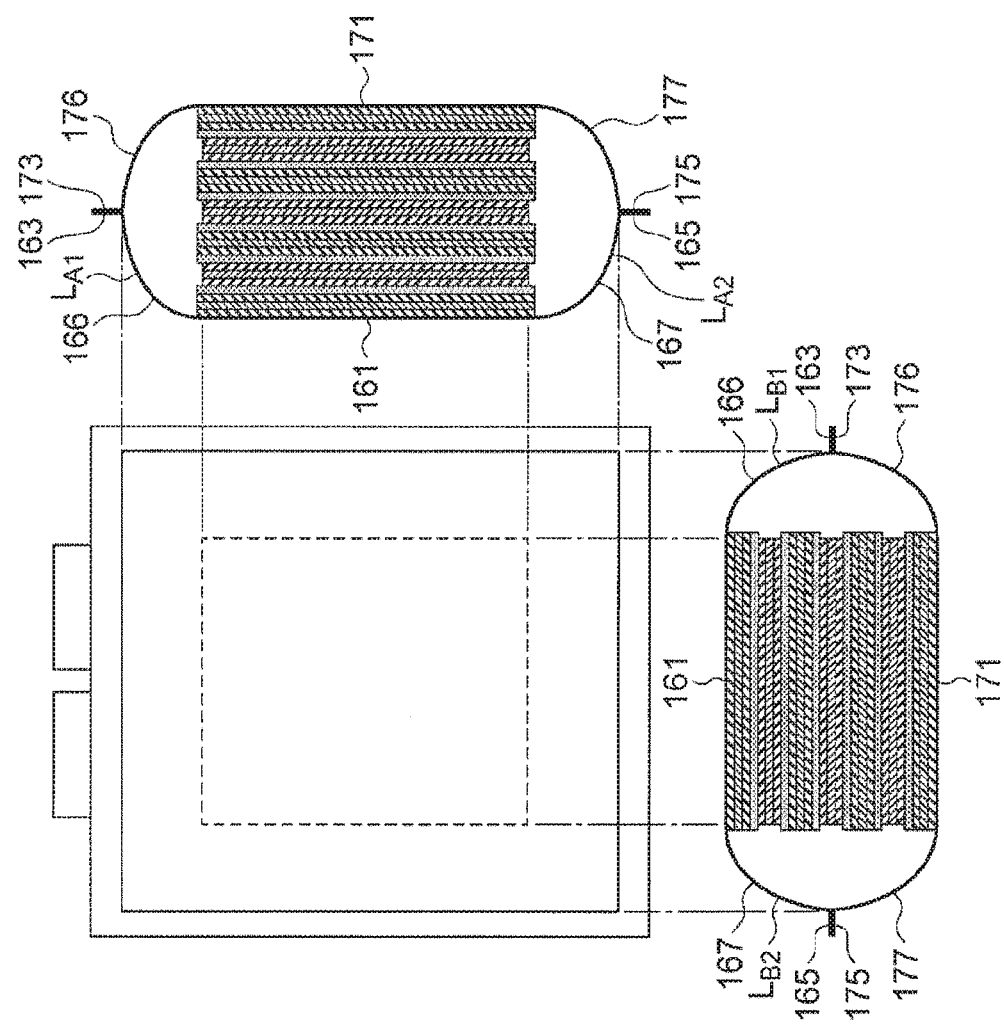
FIG. 6 is a set of plan view and cross-sectional views of a secondary battery according to another modified example of one or more embodiments of the present invention.

FIG. 6 is a set of a plan view, a cross-sectional view when cut at the xz-plane along the long side, and a cross-sectional view when cut at the yz-plane along the short side of the secondary battery 1 according to Modified Example 2, and these views are for explaining parameters ($L_A$, $L_B$, and d) included in Expressions (1), Expressions (2), Condition (1), and Condition (2).

As illustrated in FIG. 6, an upper exterior member 16 has an abutting part 161, a curved part 166 and a curved part 167, a sealing part 163, and a sealing part 165. A lower exterior member 17 has an abutting part 171, a curved part 176, a curved part 177, a sealing part 173, and a sealing part 175. The abutting parts 161 and 171 are similar to the abutting parts 161 and 171 according to one or more embodiments of the present invention, the sealing parts 163, 165, 173, and 175 are similar to the sealing parts 163, 165, 173, and 175 according to one or more embodiments of the present invention, and the description of the structures will therefore be omitted.

The curved part 166 is curved from the outer edge of the abutting part 161 and the curved part 166 extends to the sealing part 163. In the cross section when cutting through the secondary battery 1 at the xz-plane, the curved part 166 is formed to be a curve so as to expand from the inside of the secondary battery 1 to the outside, as illustrated in FIG. 6. The structure of the curved part 167 is similar to the structure of the curved part 166, and the description will therefore be omitted.

Similar to the exterior member 16, the exterior member 17 has a curved part 176 and a curved part 177 and seals the power generation element 18 from the opposite side to the exterior member 16. The abutting part 171, curved parts 176 and 177, and sealing parts 173 and 175, which constitute the exterior member 17, are similar to the abutting part 161, curved parts 166 and 167, and sealing parts 163 and 165, which constitute the exterior member 16, and the description will therefore be omitted.

As illustrated in FIG. 6, in the cross section when cut at the xz-direction along the long side, $L_{A1}$ is the length of the curved part 166 and $L_{A1}$ is the length of the curved part 167. In the cross section when cut at the yz-direction along the short side, $L_{A1}$ is the length of the curved part 166 and $L_{A2}$ is the length of the curved part 167.

Hereinafter, one or more embodiments of the present invention will be more specifically described with reference to examples and comparative examples.

<Positive Electrode>

A positive electrode active material slurry was prepared by mixing 90 wt % of an NMC composite oxide (LiNi$_{0.5}$Mn$_{0.3}$Co$_{0.2}$O$_2$ (average particle diameter: 10 µm), 5 wt % of Ketjen black as a conductive agent, 5 wt % of polyvinylidene fluoride (PVdF) as a binder, and an appropriate amount of NMP as a slurry viscosity adjusting solvent. This positive electrode active material slurry was applied to aluminum foil (thickness of 20 µm) as a collector, dried at 120° C., and then formed by compression using a roll press machine to produce each positive electrode plate 11 with a positive electrode active material layer of 18 mg/cm². Another positive electrode active material layer was also formed on the rear surface in the same manner, and the positive electrode plate 11 formed with the positive electrode active material layers on both surfaces of the positive electrode collector was thus produced. With regard to the size of the main surface of the positive electrode plate 11, the length was 215 mm and the width was 190 mm.

<Negative Electrode>

A negative electrode active material slurry was prepared by dispersing 96.5 wt % of synthetic graphite as a negative electrode active material and 1.5 wt % of ammonium salt of carboxymethyl cellulose and 2.0 wt % of styrene-butadiene copolymer latex as binders in purified water. This negative electrode active material slurry was applied to copper foil (thickness of 10 µm) as a negative electrode collector, dried at 120° C., and then formed by compression using a roll press machine to produce each negative electrode plate 13 with a negative electrode active material layer of 10 mg/cm². Another negative electrode active material layer was also formed on the rear surface in the same manner, and the negative electrode plate 13 formed with the negative electrode active material layers on both surfaces of the negative electrode collector was thus produced. With regard to the size of the main surface of the negative electrode plate 13, the length was 219 mm and the width was 194 mm.

<Production of Cell (Secondary Battery 1)>

The positive electrodes produced in the above and the negative electrodes produced in the above were alternately laminated (20 layers of positive electrodes and 21 layers of negative electrodes) via separators to produce a power generation element 18. With regard to the size of the separators, the length was 223 mm and the width was 198 mm.

The obtained power generation element 18 was placed in an aluminum laminate sheet bag and an electrolyte solution was injected therein. The electrolyte solution was prepared by dissolving 1.0 M of LiPF6 in a mixed solvent of ethylene carbonate (EC), diethyl carbonate (DEC), and ethyl methyl carbonate (EMC) (volume ratio of 1:1:1). The opening part of the aluminum laminate sheet bag was sealed under a vacuum condition so that tabs for current collection connected with both sets of electrodes would be led out, and a laminate-type lithium ion secondary battery was thereby completed.

With regard to the size of the exterior member 16, the outer length in the x-direction ($x_4$ in FIG. 4) was 256 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 231 mm and the length in the y-direction ($y_3$ in FIG. 4) was 200 mm. The size of interior space corresponds to the size of a portion of the exterior member 16 except the sealing part. With regard to the size of a portion of the exterior member 16 formed by the abutting part 161 and the flat parts 162a and 164a (referred also to as an "upper surface portion of the exterior member 16," hereinafter), the length in the x-direction ($x_2$ in FIG. 4) was 221 mm and the length in the y-direction ($y_2$ in FIG. 4) was 194 mm. The size of the exterior member 17 was the same as the size of the exterior member 16.

With regard to the size of the laminate-type power generation element 18, the length in the x-direction ($x_1$ in FIG. 4) was 215 mm, the length in the y-direction ($y_1$ in FIG. 4) was 190 mm, and the length in the z-direction (length twice d of FIG. 4) was 8 mm.

The length in the x-direction of the secondary battery 1 including the electrode terminals 14 and 15 was 280 mm, the length in the y-direction (width) was 210 mm, and the length in the z-direction (thickness) was 8 mm.

<Durability Test/Confirmation of Initial Performance>

After 0.2C_CCCV charge (upper limit voltage of 4.15 V, 8 hours) was performed for the complete secondary battery 1 in a constant temperature bath set at 25° C., 0.2C_CC discharge (lower limit voltage of 2.5 V cut) was performed and the initial charge and discharge capacity was confirmed. In addition, measurement of the volume (Archimedes' method) and measurement of the thickness were carried out.

<Durability Test>

For the complete secondary battery 1, 1C_CCCV charge (upper limit voltage of 4.15 V, 2 hours) and 1C_CC discharge (lower limit voltage of 2.5 V cut) were performed 1,000 cycles in a constant temperature bath set at 45° C. After the charge and discharge were performed 1,000 cycles, the charge and discharge capacity of the secondary battery 1 was confirmed and the secondary battery 1 was evaluated by calculating the capacity retention ratio to the initial charge and discharge capacity ((charge and discharge capacity after charge and discharge were performed 1,000 cycles)/(initial charge and discharge capacity)×100%).

Example 1

Example 1 is the secondary battery 1 produced as the above.

Example 2

With regard to the size of the upper surface portion of the exterior member 16 in the secondary battery 1 according to Example 2, the length in the x-direction ($x_2$ in FIG. 4) was 223 mm and the length in the y-direction ($y_2$ in FIG. 4) was 192 mm. Other sizes and the number of layers of the electrodes are the same as those in Example 1.

Example 3

With regard to the size of the exterior member 16 in the secondary battery 1 according to Example 3, the outer length in the x-direction ($x_4$ in FIG. 4) was 260 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 235 mm and the length in the y-direction ($y_3$ in FIG. 4) was 200 mm. With regard to the size of the upper surface portion of the exterior member 16, the length in the x-direction ($x_2$ in FIG. 4) was 225 mm and the length in the y-direction ($y_2$ in FIG. 4) was 192 mm. The length in the x-direction of the secondary battery 1 including the electrode terminals 14 and 15 was 284 mm, the length in the y-direction (width) was 210 mm, and the length in the z-direction (thickness) was 8 mm. Other sizes are the same as those in Example 1.

Example 4

With regard to the size of the exterior member 16 in the secondary battery 1 according to Example 4, the outer length in the x-direction ($x_4$ in FIG. 4) was 260 mm, the outer length in the y-direction ($y_4$ in FIG. 4) was 208 mm, and the height in the z-direction was 4 mm. With regard to the size of interior space of the secondary battery 1 for sealing the power generation element 18, the length in the x-direction ($x_3$ in FIG. 4) was 235 mm and the length in the y-direction ($y_3$ in FIG. 4) was 198 mm. With regard to the size of the upper surface portion of the exterior member 16, the length in the x-direction ($x_2$ in FIG. 4) was 225 mm and the length in the y-direction ($y_2$ in FIG. 4) was 192 mm. The length in the x-direction of the secondary battery 1 including the electrode terminals 14 and 15 was 284 mm, the length in the y-direction (width) was 208 mm, and the length in the z-direction (thickness) was 8 mm. Other sizes are the same as those in Example 1.

Example 5

With regard to the size of the exterior member 16 in the secondary battery 1 according to Example 5, the outer length in the x-direction ($x_4$ in FIG. 4) was 250 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 225 mm and the length in the y-direction ($y_3$ in FIG. 4) was 200 mm. With regard to the size of the upper surface portion of the exterior member 16, the length in the x-direction ($x_2$ in FIG. 4) was 221 mm and the length in the y-direction ($y_2$ in FIG. 4) was 192 mm. The length in the x-direction of the secondary battery 1 including the electrode terminals 14 and 15 was 274 mm, the length in the y-direction (width) was 210 mm, and the length in the z-direction (thickness) was 8 mm. Other sizes are the same as those in Example 1.

Example 6

With regard to the size of the exterior member 16 in the secondary battery 1 according to Example 6, the outer length in the x-direction ($x_4$ in FIG. 4) was 250 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 225 mm and the length in the y-direction ($y_3$ in FIG. 4) was 200 mm. With regard to the size of the upper surface portion of the exterior member 16, the length in the x-direction ($x_2$ in FIG. 4) was 217 mm and the length in the y-direction ($y_2$ in FIG. 4) was 192 mm. The length in the x-direction of the secondary battery 1 including the electrode terminals 14 and 15 was 274 mm, the length in the y-direction (width) was 210 mm, and the length in the z-direction (thickness) was 8 mm. Other sizes are the same as those in Example 1.

Example 7

With regard to the size of the exterior member 16 in the secondary battery 1 according to Example 7, the outer length in the x-direction ($x_4$ in FIG. 4) was 255 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 230 mm and the length in the y-direction ($y_3$ in FIG. 4) was 200 mm. With regard to the size of the upper surface portion of the exterior member 16, the length in the x-direction ($x_2$ in FIG. 4) was 221 mm and the length in the y-direction ($y_2$ in FIG. 4) was 192 mm. The length in the x-direction of the secondary battery 1 including the electrode terminals 14 and 15 was 279 mm, the length in the y-direction (width) was 210 mm, and the length in the z-direction (thickness) was 8 mm. Other sizes are the same as those in Example 1.

Example 8

With regard to the size of the exterior member 16 in the secondary battery 1 according to Example 8, the outer length in the x-direction ($x_4$ in FIG. 4) was 253 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 228 mm and the length in the y-direction ($y_3$ in FIG. 4) was 200 mm. With regard to the size of the upper surface portion of the exterior member 16, the length in the x-direction ($x_2$ in FIG. 4) was 219 mm and the length in the y-direction ($y_2$ in FIG. 4) was 192 mm. The length in the x-direction of the secondary battery 1 including the electrode terminals 14 and 15 was 277 mm, the length in the y-direction (width) was 210 mm, and the length in the z-direction (thickness) was 8 mm. Other sizes are the same as those in Example 1.

Example 9

With regard to the size of the main surface of the positive electrode plate 11 in the secondary battery 1 according to Example 9, the length was 205 mm and the width was 110 mm. With regard to the size of the main surface of the negative electrode plate 13, the length was 209 mm and the width was 114 mm. With regard to the size of the separator, the length was 213 mm and the width was 118 mm. With regard to the size of the exterior member 16, the outer length in the x-direction ($x_4$ in FIG. 4) was 246 mm, the outer length in the y-direction ($y_4$ in FIG. 4) was 130 mm, and the height in the z-direction was 4 mm. With regard to the size of interior space of the secondary battery 1 for sealing the power generation element 18, the length in the x-direction ($x_3$ in FIG. 4) was 221 mm and the length in the y-direction ($y_3$ in FIG. 4) was 120 mm. With regard to the size of the upper surface portion of the exterior member 16, the length in the x-direction ($x_2$ in FIG. 4) was 211 mm and the length in the y-direction ($y_2$ in FIG. 4) was 114 mm. The length in the x-direction of the secondary battery 1 including the electrode terminals 14 and 15 was 270 mm, the length in the y-direction (width) was 130 mm, and the length in the z-direction (thickness) was 8 mm. Other sizes are the same as those in Example 1.

Example 10

With regard to the size of the main surface of the positive electrode plate 11 in the secondary battery 1 according to Example 10, the length was 205 mm and the width was 110 mm. With regard to the size of the main surface of the negative electrode plate 13, the length was 209 mm and the width was 114 mm. With regard to the size of the separator, the length was 213 mm and the width was 118 mm. With regard to the size of the exterior member 16, the outer length in the x-direction ($x_4$ in FIG. 4) was 250 mm, the outer length in the y-direction ($y_4$ in FIG. 4) was 130 mm, and the height in the z-direction was 4 mm. With regard to the size of interior space of the secondary battery 1 for sealing the power generation element 18, the length in the x-direction ($x_3$ in FIG. 4) was 225 mm and the length in the y-direction ($y_3$ in FIG. 4) was 120 mm. With regard to the size of the upper surface portion of the exterior member 16, the length in the x-direction ($x_2$ in FIG. 4) was 215 mm and the length in the y-direction ($y_2$ in FIG. 4) was 112 mm. The length in the x-direction of the secondary battery 1 including the electrode terminals 14 and 15 was 274 mm, the length in the y-direction (width) was 130 mm, and the length in the z-direction (thickness) was 8 mm. Other sizes are the same as those in Example 1.

Example 11

With regard to the size of the main surface of the positive electrode plate 11 in the secondary battery 1 according to Example 11, the length was 205 mm and the width was 110 mm. With regard to the size of the main surface of the negative electrode plate 13, the length was 209 mm and the width was 114 mm. With regard to the size of the separator, the length was 213 mm and the width was 118 mm. With regard to the size of the exterior member 16, the outer length in the x-direction ($x_4$ in FIG. 4) was 240 mm, the outer length in the y-direction ($y_4$ in FIG. 4) was 130 mm, and the height in the z-direction was 4 mm. With regard to the size of interior space of the secondary battery 1 for sealing the power generation element 18, the length in the x-direction ($x_3$ in FIG. 4) was 215 mm and the length in the y-direction ($y_3$ in FIG. 4) was 120 mm. With regard to the size of the upper surface portion of the exterior member 16, the length in the x-direction ($x_2$ in FIG. 4) was 211 mm and the length in the y-direction ($y_2$ in FIG. 4) was 112 mm. The length in the x-direction of the secondary battery 1 including the electrode terminals 14 and 15 was 264 mm, the length in the y-direction (width) was 130 mm, and the length in the z-direction (thickness) was 8 mm. Other sizes are the same as those in Example 1.

Comparative Example 1

With regard to the size of the exterior member 16 in the secondary battery 1 according to Comparative Example 1, the outer length in the x-direction ($x_4$ in FIG. 4) was 250 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 225 mm and the length in the y-direction ($y_3$ in FIG. 4) was 200 mm. With regard to the size of the upper surface portion of the exterior member 16, the length in the x-direction ($x_2$ in FIG. 4) was 217 mm and the length in the y-direction ($y_2$ in FIG. 4) was 196 mm. The length in the x-direction of the secondary battery 1 including the electrode terminals 14 and 15 was 274 mm, the length in the y-direction (width) was 210 mm, and the length in the z-direction (thickness) was 8 mm. Other sizes are the same as those in Example 1.

Comparative Example 2

With regard to the size of the exterior member 16 in the secondary battery 1 according to Comparative Example 2, the outer length in the x-direction ($x_4$ in FIG. 4) was 250 mm, the outer length in the y-direction ($y_4$ in FIG. 4) was 216 mm, and the height in the z-direction was 4 mm. With regard to the size of interior space of the secondary battery 1 for sealing the power generation element 18, the length in the x-direction ($x_3$ in FIG. 4) was 225 mm and the length in the y-direction ($y_3$ in FIG. 4) was 206 mm. With regard to the size of the upper surface portion of the exterior member 16, the length in the x-direction ($x_2$ in FIG. 4) was 217 mm and the length in the y-direction ($y_2$ in FIG. 4) was 196 mm. The length in the x-direction of the secondary battery 1 including the electrode terminals 14 and 15 was 274 mm, the length in the y-direction (width) was 216 mm, and the length in the z-direction (thickness) was 8 mm. Other sizes are the same as those in Example 1.

Comparative Example 3

With regard to the size of the exterior member 16 in the secondary battery 1 according to Comparative Example 3, the outer length in the x-direction ($x_4$ in FIG. 4) was 264 mm, the outer length in the y-direction ($y_4$ in FIG. 4) was 208 mm, and the height in the z-direction was 4 mm. With regard to the size of interior space of the secondary battery 1 for sealing the power generation element 18, the length in the x-direction ($x_3$ in FIG. 4) was 239 mm and the length in the y-direction ($y_3$ in FIG. 4) was 198 mm. With regard to the size of the upper surface portion of the exterior member 16, the length in the x-direction ($x_2$ in FIG. 4) was 229 mm and the length in the y-direction ($y_2$ in FIG. 4) was 194 mm. The length in the x-direction of the secondary battery 1 including the electrode terminals 14 and 15 was 288 mm, the length in the y-direction (width) was 208 mm, and the length in the z-direction (thickness) was 8 mm. Other sizes are the same as those in Example 1.

Comparative Example 4

With regard to the size of the exterior member 16 in the secondary battery 1 according to Comparative Example 4, the outer length in the x-direction ($x_4$ in FIG. 4) was 264 mm, the outer length in the y-direction ($y_4$ in FIG. 4) was 208 mm, and the height in the z-direction was 4 mm. With regard to the size of interior space of the secondary battery 1 for sealing the power generation element 18, the length in the x-direction ($x_3$ in FIG. 4) was 239 mm and the length in the y-direction ($y_3$ in FIG. 4) was 198 mm. With regard to the size of the upper surface portion of the exterior member 16, the length in the x-direction ($x_2$ in FIG. 4) was 227 mm and the length in the y-direction ($y_2$ in FIG. 4) was 192 mm. The length in the x-direction of the secondary battery 1 including the electrode terminals 14 and 15 was 288 mm, the length in the y-direction (width) was 208 mm, and the length in the z-direction (thickness) was 8 mm. Other sizes are the same as those in Example 1.

Comparative Example 5

With regard to the size of the main surface of the positive electrode plate 11 in the secondary battery 1 according to Comparative Example 5, the length was 205 mm and the width was 110 mm. With regard to the size of the main surface of the negative electrode plate 13, the length was 209 mm and the width was 114 mm. With regard to the size of the separator, the length was 213 mm and the width was 118 mm. With regard to the size of the exterior member 16, the outer length in the x-direction ($x_4$ in FIG. 4) was 240 mm, the outer length in the y-direction ($y_4$ in FIG. 4) was 136 mm, and the height in the z-direction was 4 mm. With regard to the size of interior space of the secondary battery 1 for sealing the power generation element 18, the length in the x-direction ($x_3$ in FIG. 4) was 215 mm and the length in the y-direction ($y_3$ in FIG. 4) was 126 mm. With regard to the size of the upper surface portion of the exterior member 16, the length in the x-direction ($x_2$ in FIG. 4) was 209 mm and the length in the y-direction ($y_2$ in FIG. 4) was 118 mm. The length in the x-direction of the secondary battery 1 including the electrode terminals 14 and 15 was 264 mm, the length in the y-direction (width) was 136 mm, and the length in the z-direction (thickness) was 8 mm. Other sizes are the same as those in Example 1.

Comparative Example 6

With regard to the size of the main surface of the positive electrode plate 11 in the secondary battery 1 according to Comparative Example 6, the length was 205 mm and the width was 110 mm. With regard to the size of the main surface of the negative electrode plate 13, the length was 209 mm and the width was 114 mm. With regard to the size of the separator, the length was 213 mm and the width was 118 mm. With regard to the size of the exterior member 16, the outer length in the x-direction ($x_4$ in FIG. 4) was 254 mm, the outer length in the y-direction ($y_4$ in FIG. 4) was 128 mm, and the height in the z-direction was 4 mm. With regard to the size of interior space of the secondary battery 1 for sealing the power generation element 18, the length in the x-direction ($x_3$ in FIG. 4) was 229 mm and the length in the y-direction ($y_3$ in FIG. 4) was 118 mm. With regard to the size of the upper surface portion of the exterior member 16, the length in the x-direction ($x_2$ in FIG. 4) was 217 mm and the length in the y-direction ($y_2$ in FIG. 4) was 112 mm. The length in the x-direction of the secondary battery 1 including the electrode terminals 14 and 15 was 278 mm, the length in the y-direction (width) was 128 mm, and the length in the z-direction (thickness) was 8 mm. Other sizes are the same as those in Example 1.

Evaluation results for Examples 1 to 11 and Comparative Examples 1 to 6 are listed in Tables 1-1 and 1-2.

TABLE 1-1

| | Electrode long side | Electrode short side | d | $b_A$ | $b_B$ | $a_A$ | $a_B$ |
|---|---|---|---|---|---|---|---|
| Example 1 | 215 | 190 | 4 | 8 | 5 | 3 | 2 |
| Example 2 | 215 | 190 | 4 | 8 | 5 | 4 | 1 |
| Example 3 | 215 | 190 | 4 | 10 | 5 | 5 | 1 |
| Example 4 | 215 | 190 | 4 | 10 | 4 | 5 | 1 |
| Example 5 | 215 | 190 | 4 | 5 | 5 | 3 | 1 |
| Example 6 | 215 | 190 | 4 | 5 | 5 | 1 | 1 |
| Example 7 | 215 | 190 | 4 | 7.5 | 5 | 3 | 1 |
| Example 8 | 215 | 190 | 4 | 6.5 | 5 | 2 | 1 |
| Example 9 | 205 | 110 | 4 | 8 | 5 | 3 | 2 |
| Example 10 | 205 | 110 | 4 | 10 | 5 | 5 | 1 |
| Example 11 | 205 | 110 | 4 | 5 | 5 | 3 | 1 |
| Comparative Example 1 | 215 | 190 | 4 | 5 | 5 | 1 | 3 |
| Comparative Example 2 | 215 | 190 | 4 | 5 | 8 | 1 | 3 |
| Comparative Example 3 | 215 | 190 | 4 | 12 | 4 | 7 | 2 |
| Comparative Example 4 | 215 | 190 | 4 | 12 | 4 | 6 | 1 |
| Comparative Example 5 | 205 | 110 | 4 | 5 | 8 | 2 | 4 |
| Comparative Example 6 | 205 | 110 | 4 | 12 | 4 | 6 | 1 |

TABLE 1-2

| | $L_A$ | $L_B$ | $L_A/L_B$ | $L_A/d$ | $L_B/d$ | $a_A/a_B$ | $a_A/d$ | $a_B/d$ | Capacity retention ratio |
|---|---|---|---|---|---|---|---|---|---|
| Example 1 | 9.4 | 7 | 1.34 | 2.35 | 1.75 | 1.5 | 0.75 | 0.5 | 82.7 |
| Example 2 | 9.7 | 6.7 | 1.45 | 2.425 | 1.675 | 4 | 1 | 0.25 | 82.6 |
| Example 3 | 11.4 | 6.7 | 1.70 | 2.85 | 1.675 | 5 | 1.25 | 0.25 | 83.2 |
| Example 4 | 11.4 | 6 | 1.90 | 2.85 | 1.5 | 5 | 1.25 | 0.25 | 82 |
| Example 5 | 7.5 | 6.7 | 1.12 | 1.875 | 1.675 | 3 | 0.75 | 0.25 | 81 |
| Example 6 | 6.7 | 6.7 | 1.00 | 1.675 | 1.675 | 1 | 0.25 | 0.25 | 80.9 |
| Example 7 | 9.1 | 6.7 | 1.36 | 2.275 | 1.675 | 3 | 0.75 | 0.25 | 84 |
| Example 8 | 8.1 | 6.7 | 1.21 | 2.025 | 1.675 | 2 | 0.5 | 0.25 | 83.2 |
| Example 9 | 9.4 | 7 | 1.34 | 2.35 | 1.75 | 1.5 | 0.75 | 0.5 | 82 |

TABLE 1-2-continued

|  | $L_A$ | $L_B$ | $L_A/L_B$ | $L_A/d$ | $L_B/d$ | $a_A/a_B$ | $a_A/d$ | $a_B/d$ | Capacity retention ratio |
|---|---|---|---|---|---|---|---|---|---|
| Example 10 | 11.4 | 6.7 | 1.70 | 2.85 | 1.675 | 5 | 1.25 | 0.25 | 82.6 |
| Example 11 | 8 | 6.7 | 1.19 | 2 | 1.675 | 3 | 0.75 | 0.25 | 81.1 |
| Comparative Example 1 | 6.7 | 7.5 | 0.89 | 1.675 | 1.875 | 0.333333 | 0.25 | 0.75 | 77.3 |
| Comparative Example 2 | 6.7 | 9.4 | 0.71 | 1.675 | 2.35 | 0.333333 | 0.25 | 0.75 | 73.6 |
| Comparative Example 3 | 13.4 | 6.5 | 2.06 | 3.35 | 1.625 | 3.5 | 1.75 | 0.5 | 78.7 |
| Comparative Example 4 | 13.2 | 6 | 2.20 | 3.3 | 1.5 | 6 | 1.5 | 0.25 | 76.1 |
| Comparative Example 5 | 7 | 9.7 | 0.72 | 1.75 | 2.425 | 0.5 | 0.5 | 1 | 71.4 |
| Comparative Example 6 | 13.2 | 6 | 2.20 | 3.3 | 1.5 | 6 | 1.5 | 0.25 | 76.8 |

In Tables 1-1 and 1-2, the electrode long side and the electrode short side represent the long side and the short side, respectively, of the lamination surface of the electrode plates.

Figure 7:
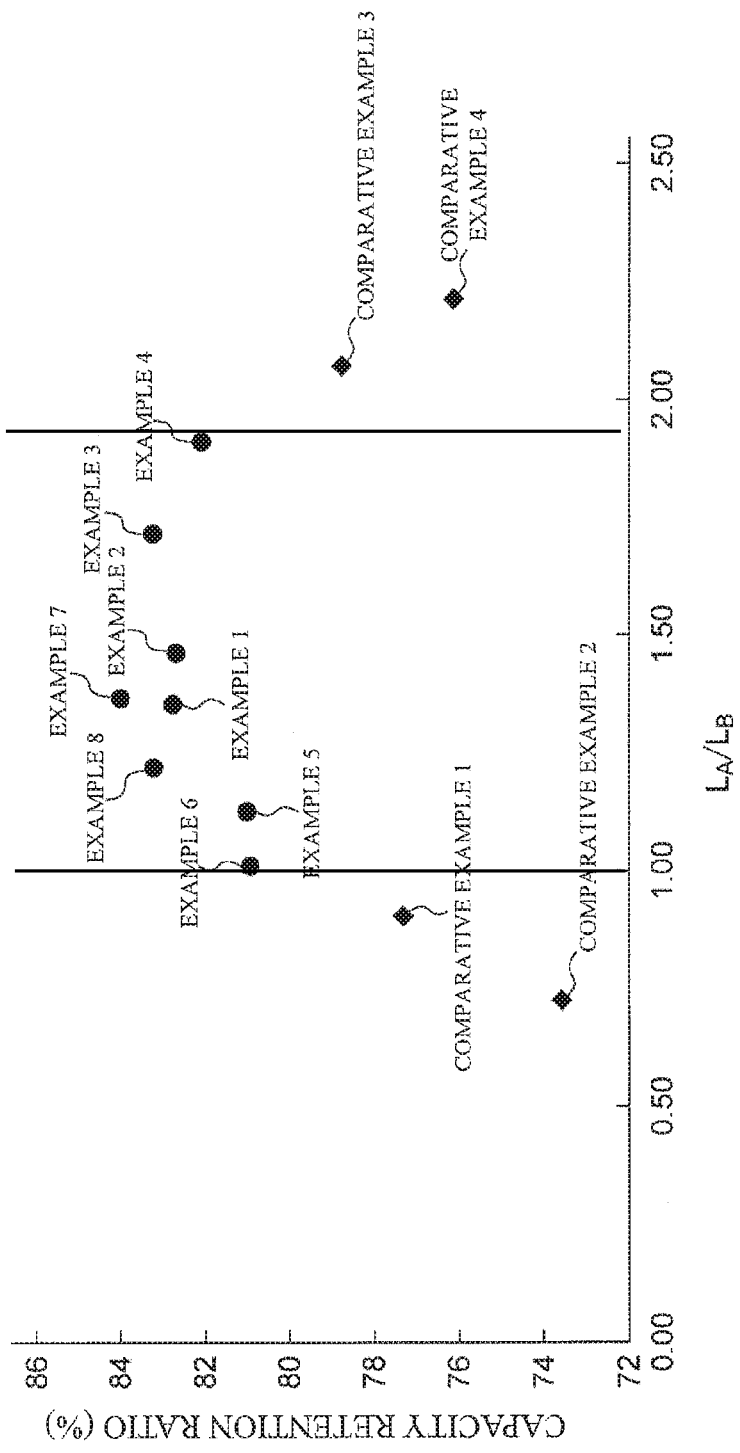
FIG. 7 is a graph illustrating the capacity retention ratio to the parameter ($L_A/L_B$) in the secondary batteries according to Examples 1 to 9 and Comparative Examples 1 to 4.
Figure 8:
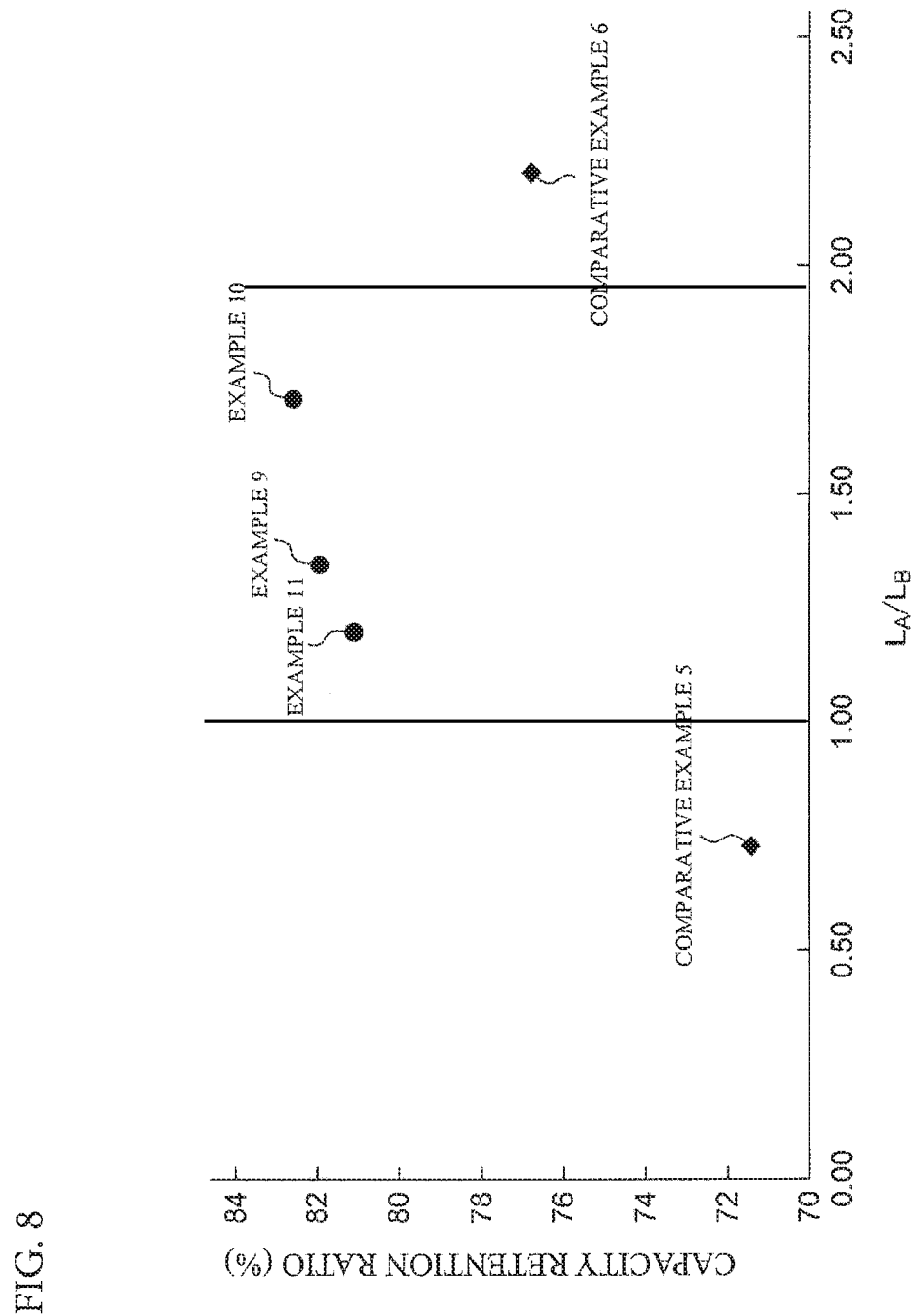
FIG. 8 is a graph illustrating the capacity retention ratio to the parameter ($L_A/L_B$) in the secondary batteries according to Examples 10 and 11 and Comparative Examples 5 and 6.

FIG. 7 represents the capacity retention ratio to $L_A/L_B$ in the secondary batteries 1 according to Examples 1 to 8 and Comparative Examples 1 to 4 (the size of the lamination surface of the electrode plates is 215×190). FIG. 8 represents the capacity retention ratio to $L_A/L_B$ in the secondary batteries 1 according to Examples 9 to 11 and Comparative Examples 5 and 6 (the size of the lamination surface of the electrode plates is 205×110).

As listed in Tables 1-1 and 1-2 and illustrated in the graphs of FIGS. 7 and 8, according to the secondary batteries 1 (Examples 1 to 12) in which the parameters ($L_A$ and $L_B$) are defined to satisfy Expression (1), a high capacity retention ratio (capacity retention ratio of 80% or more) can be obtained even after the use of 1,000 cycles. In addition, according to the secondary batteries 1 in which the parameters ($L_A$, $L_B$, and d) are defined to satisfy Condition (1), a high capacity retention ratio (capacity retention ratio of 80% or more) can be obtained after the use of 1,000 cycles. Moreover, according to the secondary batteries 1 in which the parameters ($a_A$ and $a_B$) are defined to satisfy Expression (2), a high capacity retention ratio (capacity retention ratio of 80% or more) can be obtained after the use of 1,000 cycles. Furthermore, according to the secondary batteries 1 in which the parameters ($a_A$, $a_B$, and d) are defined to satisfy Condition (2), a high capacity retention ratio (capacity retention ratio of 80% or more) can be obtained after the use of 1,000 cycles.

In contrast, the secondary batteries 1 (Comparative Examples 1 to 6) in which the parameters ($L_A$ and $L_B$) do not satisfy Expression (1) result in poor capacity retention ratio after the use of 1,000 cycles.

Figure 9A:
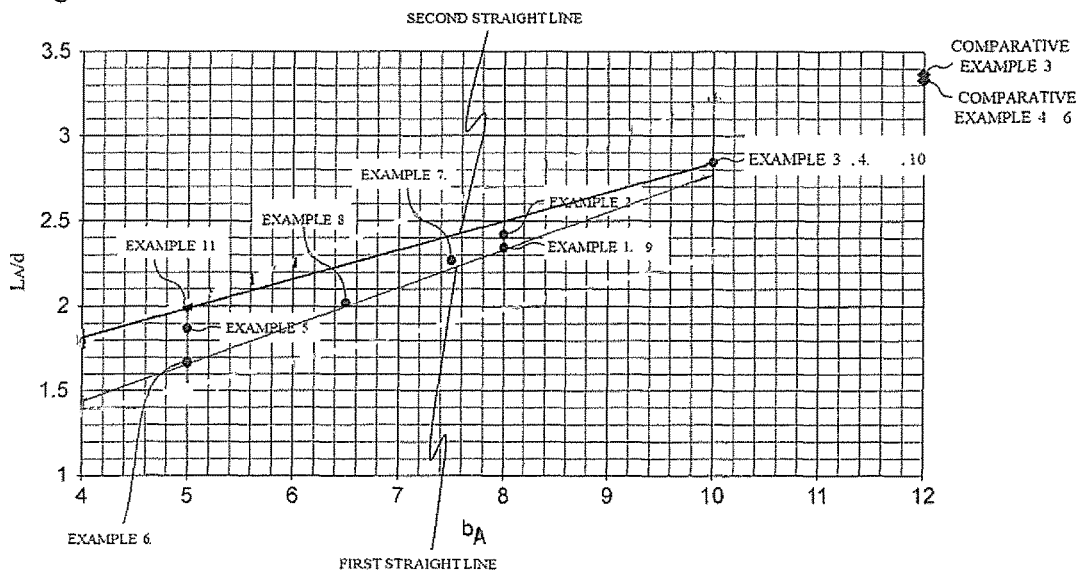
FIG. 9A is a graph illustrating the relationship between the parameter (b) and the parameter ($L_A/d$) in the second batteries according to Examples 1 to 11 and Comparative Examples 3, 4, and 6.
Figure 9B:
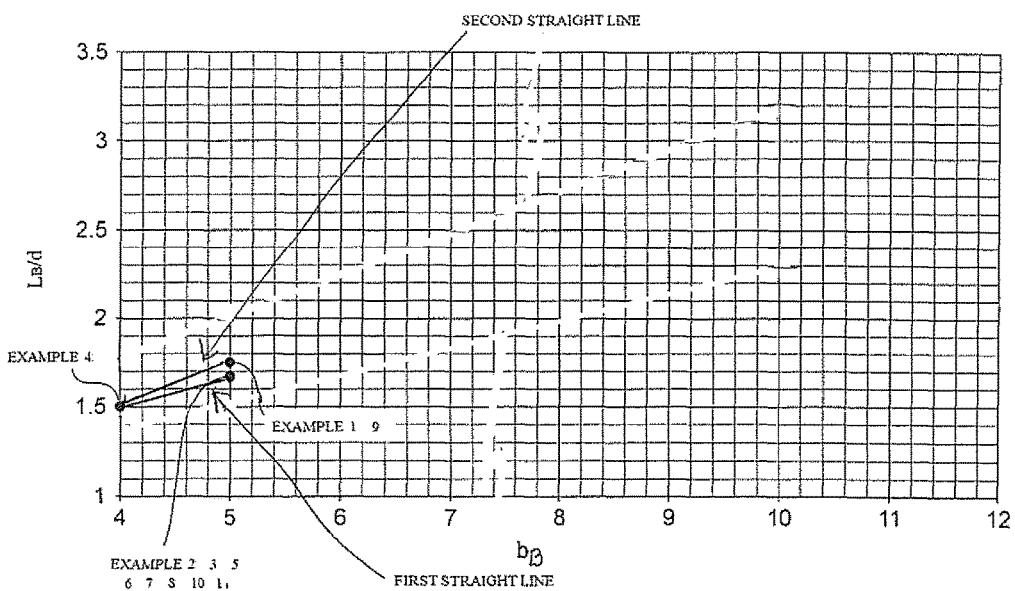
FIG. 9B is a graph illustrating the relationship between the parameter (b) and the parameter ($L_B/d$) in the second batteries according to Examples 1 to 11 and Comparative Examples 3, 4, and 6.

FIGS. 9A and 9B illustrate evaluation results for values of $L_A/d$ to $b_A$ and values of $L_B/d$ to $b_B$ in Examples 1 to 11 and Comparative Examples 4 and 6, respectively. The horizontal axis represents $b_A$ or $b_B$ and the vertical axis represents $L_A/d$ or $L_B/d$, in FIGS. 9A and 9B, respectively. In FIG. 9A, Example 1 represents the value of $L_A/d$ to $b_A$ and Example 1 in FIG. 9B represents the value of $L_B/d$ to $b_B$. The same applies to other examples and comparative examples. Comparative Examples 1, 2, and 5 are not illustrated because $L_A/d \geq L_B/d$ of Condition 1 is not satisfied.

In the coordinates of $b_A$ and $L_A/d$ illustrated in FIG. 9A, the minimum value and maximum value of $L_A/d$ to $b_A$ are defined within a range of $4 \leq b_A \leq 10$. The minimum value represents a minimum size of a shape of extra space that allows a desired capacity retention ratio (e.g. 80%) to be obtained even in a secondary battery used a certain number of times. The minimum value is represented by a ratio in association with $b_A$ and $L_A/d$. In other words, when the value of $L_A/d$ to $b_A$ is less than the minimum value, the capacity retention ratio is less than a desired capacity retention ratio because the extra space cannot sufficiently be ensured in a secondary battery used a certain number of times.

On the other hand, the maximum value represents a maximum size of a shape of extra space that allows uniform cell reaction. The maximum value represented by a ratio in association with $b_A$ and $L_A/d$. In other words, when the value of $L_A/d$ to $b_A$ is not less than the maximum value, the volume of extra space is unduly large, thus causing ununiform cell reaction and poor durability of the cell.

As for Examples 1 to 11, the minimum value ($L_A/d$) is 1.45 when $b_A$=4, the minimum value of $L_B/d$ is 1.5 when $b_B$=4, and the minimum value of $L_A/d$ is 2.75 when $b_A$=10. The maximum value ($L_A/d$) is 1.8 when $b_A$=4, the maximum value of $L_B/d$ is 1.75 when $b_B$=5, and the maximum value of $L_A/d$ is 2.85 when $b_A$=10.

When respective approximation straight lines are drawn for the minimum and maximum values, the graphs of FIGS. 9A and 9B are obtained. As illustrated in FIGS. 9A and 9B, it can be confirmed that Examples 1 to 11 of a high capacity retention ratio fall between the straight line which represents the minimum values and the straight line which represents the maximum values. It can also be confirmed that Comparative Examples 3, 4, and 6 do not fall between the straight line of the minimum values and the straight line of the maximum values within a range of $4 \leq b_A \leq 10$. It can thus be confirmed that satisfying Condition 1 is one of conditions for obtaining a high capacity retention ratio. In the graphs of straight lines illustrated in FIGS. 9A and 9B, the straight line which represents the minimum values corresponds to the first straight line defining Condition 1, and the straight line which represents the maximum values corresponds to the second straight line defining Condition 1.

Figure 10A:
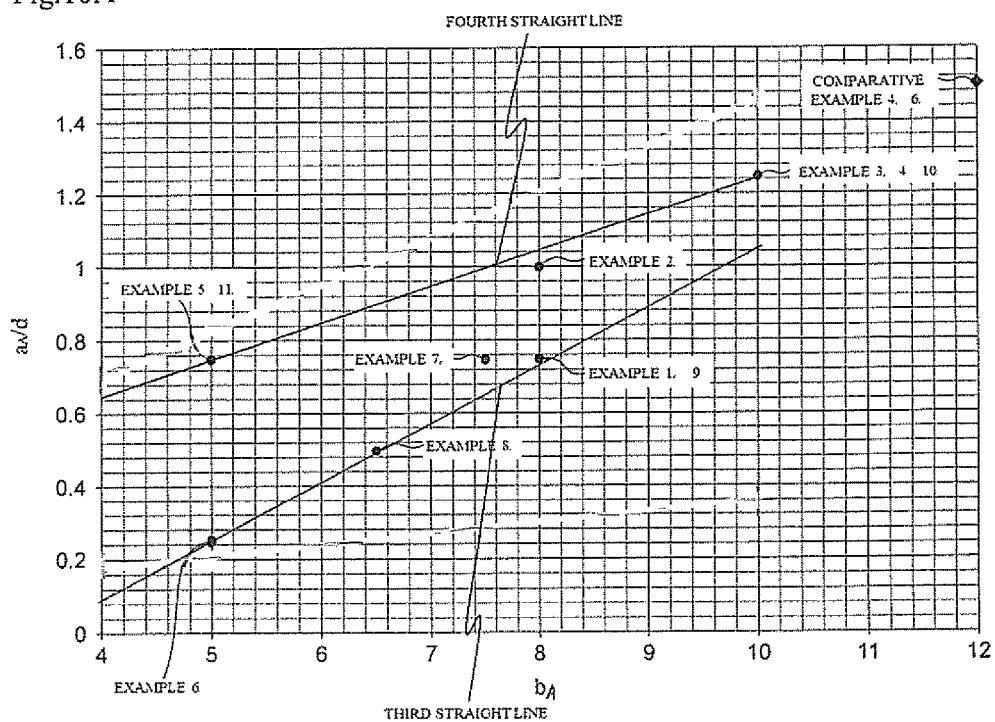
FIG. 10A is a graph illustrating the relationship between the parameter (b) and the parameter ($a_A/d$) in the secondary batteries according to Examples 1 to 11 and Comparative Examples 4 and 6.
Figure 10B:
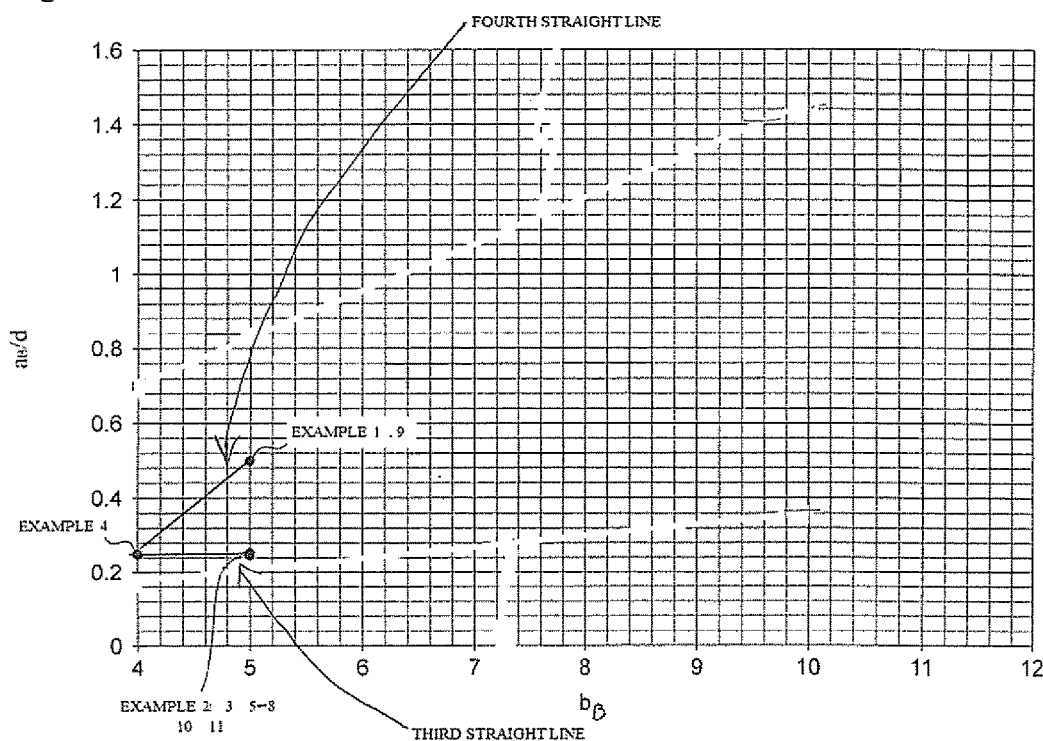
FIG. 10B is a graph illustrating the relationship between the parameter (b) and the parameter ($a_B/d$) in the secondary batteries according to Examples 1 to 11 and Comparative Examples 4 and 6.

Similarly, values of $a_A/d$ to $b_A$ and values of $a_B/d$ to $b_B$ are evaluated in Examples 1 to 11 and Comparative Examples 4 and 6. FIGS. 10A and 10B illustrate the evaluation results. Indication of Example 1 and the like is the same as that of FIGS. 9A and 9B. Comparative Examples 1, 2, and 5 are not illustrated because $a_A/d \geq a_B/d$ of Condition 2 is not satisfied. Comparative Example 3 is not illustrated in FIGS. 10A and 10B, but as/d=1.75 when $b_A$=12 (see Tables 1-1 and 1-2).

As for Examples 1 to 11, the minimum value of $a_A/d$ is 0.11 when $b_A$=4, the minimum value of $a_B/d$ is 0.21 when $b_B$=4, and the minimum value of $a_A/d$ is 1.1 when b=10. The maximum value of $a_A/d$ is 0.71 when $b_A=4$, the maximum value of $a_B/d$ is 0.21 when b=4, and the maximum value of $a_A/d$ is 1.46 when $b_A=10$.

When respective approximation straight lines are drawn for the minimum and maximum values, the graphs of FIGS. 10A and 10B are obtained. As illustrated in FIGS. 10A and 10B, it can be confirmed that Examples 1 to 11 of a high capacity retention ratio fall between the straight line which represents the minimum values and the straight line which represents the maximum values. It can also be confirmed that Comparative Examples 3, 4, and 6 do not fall between the straight line of the minimum values and the straight line of the maximum values within a range of $4 \leq b_A \leq 10$. It can thus be confirmed that satisfying Condition 2 is one of conditions for obtaining a high capacity retention ratio. In the graphs of straight lines illustrated in FIGS. 10A and 10B, the straight line which represents the minimum values corresponds to the third straight Line defining Condition 2, and the straight line which represents the maximum values corresponds to the fourth straight Line defining Condition 2.

The straight lines illustrated in FIGS. 9A and 9B and FIGS. 10A and 10B are each an approximation straight line in terms of at least two Examples that fall along the line, but a straight line that connects between two points or an approximation curve of four or more points may also be employed.

The invention claimed is:

1. A flat lithium ion secondary battery comprising:
a laminate-type power generation element in which two or more positive electrode plates and negative electrode plates are laminated via each of separators, wherein:
the positive electrode plate includes an NMC composite oxide and polyvinylidene fluoride,
the negative electrode plate includes a mixture of graphite and polyvinylidene fluoride or a mixture of graphite and styrene-butadiene copolymer latex,
the electrolyte solution includes ester-based solvent of propylene carbonate, ethylene carbonate, dimethyl carbonate, diethyl carbonate or ethyl methyl carbonate as an organic liquid solvent; and
a pair of rectangular exterior members defined by long sides and short sides when viewed from a lamination direction of the two or more positive electrode plates and negative electrode plates, the rectangular exterior members sealing the laminate-type power generation element and an electrolyte solution, wherein
at least one exterior member of the pair of the rectangular exterior members comprises:
an abutting part including an abutting surface that abuts against an uppermost layer electrode of the positive electrode plates and negative electrode plates;
a sealing part at which the rectangular exterior members overlap each other at an outer circumferential position of the rectangular exterior members; and
an extending part that extends from the abutting part to the sealing part, a space defined by the rectangular exterior members is defined by:

$1.0 \leq L_A/L_B \leq 1.90$, $b_A$, a length from the sealing parts to an electrode directly across from the sealing parts in millimeters, is within the range from 4 mm or more to 10 mm or less,
$L_A/d \geq L_B/d$, wherein d is a thickness of the laminate-type power generation element from the uppermost layer electrode to the electrode directly across from the sealing parts, and a value of $L_A/d$ to b is between a first straight line and a second straight line, the first straight line defined between ($b_A=5$, $L_A/d=1.675$) and ($b_A=10$, $L_A/d=2.75$) and the second straight line defined between ($b_A=5$, $L_A/d=2.0$) and ($b_A=10$, $L_A/d=2.85$), such that:
$L_A/d$ is within the range from 1.675 or more to 2.0 or less when $b_A$ is 5 mm,
$L_A/d$ is within the range from 2.75 or more to 2.85 or less when $b_A$ is 10 mm, wherein:
$L_A$ is an average of lengths of the extending parts located at both ends in a direction parallel to the long sides in a first cross section of the flat secondary battery when cutting through the flat secondary battery by a plane parallel to the long sides and along the lamination direction, and
$L_B$ is an average of lengths of the extending parts located at both ends in a direction parallel to the short sides in a second cross section of the flat secondary battery when cutting through the flat secondary battery by a plane parallel to the short sides and along the lamination direction,
a value of a ratio of a battery surface area to a rated capacity of the flat lithium ion secondary battery is 5 $cm^2$/Ah or more, the rated capacity is 3 Ah or more, and the battery surface area is a projected area of the flat lithium ion secondary battery including a battery exterior body,
a capacity retention ratio is 80% or more and the capacity retention ratio is a capacity retention ratio to initial capacity retention ratio of the flat lithium ion secondary battery when used 1000 cycles, and
an aspect ratio of the electrode plates is 1 to 3, and the aspect ratio is defined as a ratio of a length of the long sides to a length of the short sides of a lamination surface of the two or more positive electrode plates and negative electrode plates.

2. The flat lithium ion secondary battery according to claim 1, wherein the extending part includes a flat surface part that is in the same plane with the abutting surface and the flat secondary battery satisfies $1 \leq a_A/a_B \leq 5$,
wherein the $a_A$ represents an average of lengths of a pair of the flat surface parts located in a direction parallel to the long sides and at both ends in the first cross section, and
the $a_B$ represents an average of lengths of a pair of the flat surface parts located in a direction parallel to the short sides and at both ends in the second cross section.

3. The flat lithium ion secondary battery according to claim 1, wherein:
the extending part includes a flat surface part that is in the same plane with the abutting surface, the flat secondary battery satisfies $a_A/d \geq a_B/d$, and a value of the $a_A/d$ to the $b_A$ is between a third straight line and a fourth straight line within a range of $5 \leq b_A \leq 10$, the third straight line defined between ($b_A=5$, $a_A/d=0.26$) and ($b_A=10$, $a_A/d=1.06$) and the fourth straight line defined between ($b_A=5$, $a_A/d=0.75$) and ($b_A=10$, $a_A/d=1.25$), such that:
$a_A/d$ is within the range from 0.26 or more to 0.75 or less when $b_A$ is 5 mm,
$a_A/d$ is within the range from 1.06 or more to 1.25 or less when $b_A$ is 10 mm.

* * * * *